(12) United States Patent
Morikuni

(10) Patent No.: US 9,417,513 B2
(45) Date of Patent: Aug. 16, 2016

(54) PROJECTOR, PROJECTION UNIT AND INTERACTIVE BOARD

(75) Inventor: Eiji Morikuni, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 922 days.

(21) Appl. No.: 13/040,735

(22) Filed: Mar. 4, 2011

(65) Prior Publication Data

US 2011/0216289 A1    Sep. 8, 2011

(30) Foreign Application Priority Data

Mar. 5, 2010   (JP) ................................. 2010-048845
Feb. 7, 2011   (JP) ................................. 2011-023650

(51) Int. Cl.
   *G03B 21/62*   (2014.01)
   *G03B 21/28*   (2006.01)

(52) U.S. Cl.
   CPC ..................................... *G03B 21/28* (2013.01)

(58) Field of Classification Search
   CPC ........ G02B 13/18; G03B 21/62; G03B 21/14; H04N 7/142
   USPC ........... 353/70, 69; 348/E5.128, 744, E5.138; 359/651
   See application file for complete search history.

(56) References Cited

U.S. PATENT DOCUMENTS

| 2001/0048558 | A1 | 12/2001 | Lin |
| 2001/0050758 | A1* | 12/2001 | Suzuki et al. .................. 353/69 |
| 2004/0174611 | A1 | 9/2004 | Hatakeyama |
| 2005/0001997 | A1* | 1/2005 | Kawaai et al. ................. 353/97 |
| 2005/0206854 | A1* | 9/2005 | Katase ............................ 353/79 |
| 2007/0146646 | A1* | 6/2007 | Rodriguez, Jr. ................ 353/69 |
| 2008/0158439 | A1 | 7/2008 | Nishikawa |
| 2009/0168031 | A1 | 7/2009 | Imaoka et al. |

FOREIGN PATENT DOCUMENTS

| CN | 101187727 A | 5/2008 |
| JP | A-6-11767 | 1/1994 |
| JP | A-2000-19647 | 1/2000 |
| JP | A-2002-6398 | 1/2002 |
| JP | A-2002-207168 | 7/2002 |
| JP | A-2003-136892 | 5/2003 |
| JP | A-2003-152927 | 5/2003 |
| JP | A-2004-85752 | 3/2004 |
| JP | A-2004-252345 | 9/2004 |
| JP | A-2004-295107 | 10/2004 |
| JP | A-2005-266601 | 9/2005 |
| JP | A-2007-11248 | 1/2007 |
| JP | A-2008-83428 | 4/2008 |
| JP | A-2008-90200 | 4/2008 |
| JP | A-2009-83277 | 4/2009 |
| JP | A-2009-122587 | 6/2009 |
| JP | A-2009-157223 | 7/2009 |
| JP | A-2009-527002 | 7/2009 |

* cited by examiner

*Primary Examiner* — William C Dowling
*Assistant Examiner* — Jerry Brooks
(74) *Attorney, Agent, or Firm* — Oliff PLC

(57) ABSTRACT

A projector includes: a body including a light source, a display plane illuminated with light from the light source, and a projection optical system which projects light from the display plane; and a projection unit which projects the light from the display plane, which is projected from the projection optical system, toward an illumination-targeted plane, wherein the projection unit includes a negative power convex angle-widening mirror, and wherein the angle-widening mirror reflects light forming an image plane of the display plane for angle-widening, the image plane being inclined to the display plane.

28 Claims, 30 Drawing Sheets

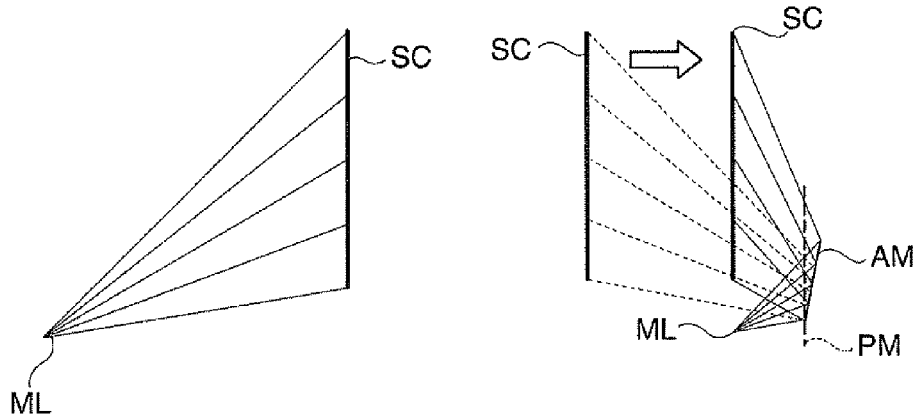
FIG. 7A
FIG. 7C
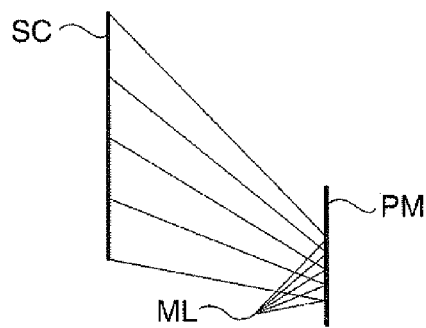
FIG. 7B
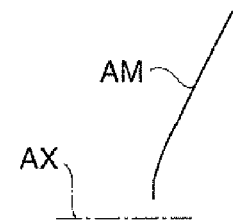
FIG. 7D

PROJECTOR, PROJECTION UNIT AND INTERACTIVE BOARD

BACKGROUND

1. Technical Field

The present invention relates to a projector, a projection unit and an interactive board, and more particularly, to a projector for ultra-short projection.

2. Related Art

In recent years, projectors including a projection optical system for so-called ultra-short projection to allow display of a large-sized screen over a short projection distance have been manufactured. The use of such a projection optical system allows display of a large-sized screen over an extremely short distance (for example, a 100-inch screen over a projection distance of 40 cm) as compared to a front projection type projector in the related art. Generally such projectors can be used only for extremely short distance projection, but it is expected that the capabilities of such projectors, which are well known in the art, can be extended from extremely short distance projection to middle and long distance projection, depending on their usage purposes. For example, JP-A-2002-6398 discloses a projector technique for expanding a zoom ratio of a projection lens by means of a reflecting projection unit mounted at a screen side. In this technique, it is possible to obtain images having different zoom ratios under a state where the reflecting projection unit is attached and a state where it is detached.

If the reflecting projection unit of JP-A-2002-6398 is to be applied to extremely short distance projection, there is a need to significantly increase the zoom ratio. In this case, it is very difficult to provide a decreased aberration with the increased zoom ratio. In addition, with the arrangement where a plurality of curved surface mirrors are eccentric to an optical axis (center axis) of lenses, it is likely that even a small deviation of any optical element may have a great effect on images. Accordingly, in order to obtain a desired optical performance, there is a need for adjustment with very high precision and further it is difficult to decrease an aberration using an eccentric optical system.

With the recent increase in multimedia content, so-called interactive boards have been popularized and used in the fields of education, presentation and the like. An interactive board is characterized in that, while content is displayed, a user can write something to the content. Typically, since the interactive board is the same size as existing blackboards or whiteboards, the interactive board requires a relatively extensive range display. However, application of a typical direct-view type monitor for the extensive range display of the interactive board may cause problems in terms of weight, power consumption and cost of the entire apparatus.

For example, JP-A-2003-136892 and JP-A-2004-252345 disclose an interactive board technique for reflecting image light, which is projected from a projector, to a transmission type screen by a plane mirror. JP-A-2009-83277 discloses a technique of an interactive board including an extremely short projection distance type projector. An enlarged projection using a projector allows extensive range display. The use of a projector allows reduction of weight, power consumption and cost of an apparatus. However, in the techniques disclosed in JP-A-2003-3.36892 and JP-A-2004-252345, the extensive plane mirror is placed to be inclined to the transmission type screen, thereby increasing a size in a depth direction, which may result in poor installability. The projector in the technique disclosed in JP-A-2009-83277 can be only applied to extremely short distance projection, which results in limited usage and poor convenience.

SUMMARY

An advantage of some aspect of the invention is to provide a projector which is capable of display of an image by an ultra-short projection over an extremely short distance and display of an image by a projection over middle and long distances, and a projection unit used for the projector. Another advantage of some aspect of the invention is to provide an interactive board capable of reducing weight, power consumption and costs and suppressing a depth size with increased convenience.

A first aspect of the invention is directed to a projector including: a body including a light source, a display plane illuminated with light from the light source, and a projection optical system which projects light from the display plane; and a projection unit which projects the light from the display plane, which is projected from the projection optical system, toward an illumination-targeted plane. The projection unit includes a negative power convex angle-widening mirror. The angle-widening mirror reflects light forming an image plane of the display plane for angle-widening, the image plane being inclined to the display plane.

The projector of the first aspect of the invention allows an extremely short distance projection by a combination of the body and the projection unit. The body may be detached from the projection unit to allow a middle and long distance projection by the body alone. Here, since the light forming the image plane sufficiently inclined to the display plane or the optical axis (that is, an image plane sufficiently inclined to a normal line of the optical axis or a plane perpendicular to the optical axis) is reflected for angle-widening by the angle-widening mirror provided in the projection unit, it is possible to achieve a satisfactory ultra-short projection with an aberration such as a distortion suppressed without employing an eccentric optical system. In addition, by widening an angle of light forming an image by reflection from the angle-widening mirror, it is possible to reduce a chromatic aberration due to the angle-widening. Accordingly, the projector is capable of display of an image by an extremely short distance ultra-short projection and display of an image by a middle and long distance projection.

A second aspect of the invention is directed to the projector of the first aspect of the invention, wherein the projection unit includes an image plane control optical system in which the light projected from the projection optical system is light forming the image plane of the display plane, the image plane being inclined to the display plane. The image plane control optical system can incline the image plane of the display plane without imposing a burden on the projection optical system.

In a specific aspect of the projector of the second aspect of the invention, the projection unit may include a variable magnification optical system which converts magnification of an image forming the image plane of the display plane, the image plane being inclined to the display plane. In this case, as the image plane control optical system inclines an image plane of an image formed beyond a normal projection range by the projection optical system, it is possible to provide an image of an appropriate size using the variable magnification optical system.

In another aspect of the invention, the projection unit may form the image plane of the display plane, the image plane being inclined to the display plane, on the illumination-targeted plane parallel to the display plane. That is, an appropriate image with no inclination can be observed.

In another aspect of the invention, the projection optical system may be switched between a normal display state where an image forming the image plane of the display plane, the image plane being parallel to the display plane, is formed in a first range of a relatively long distance along an optical axis and a macro display state where an image forming the image plane of the display plane, the image plane being parallel to the display plane, is formed in a second range of a relatively short distance along the optical axis. Accordingly, the projection optical system can cover a wide projection range from an extremely short distance to a middle and long distance. In addition, the projection optical system can form a relatively large image at a relatively long distance in the normal display state and the projection optical system can form a relatively small image at a relatively short distance in the macro display state.

In another aspect of the invention, the body can be attached to or detached from the projector. Accordingly, the body, which is relatively light, can be taken out of the projector to allow a middle and long distance projection.

In another aspect of the invention, the projection optical system and the projection unit may be arranged with the optical axes thereof coincided with each other. This facilitates adjustment of optical systems and machining of optical elements to obtain desired optical performance. In particular, this facilitates alignment of the body with the projection unit.

In another aspect of the invention, the projecting optical system and the projection unit may constitute a shift optical system which shifts the light from the display plane from the optical axis and travels the shifted light. This can travel angle-widened light to the illumination-targeted plane while avoiding interference between the light reflected by the angle-widening mirror and optical elements on the optical axis.

A projection unit related to one aspect of the invention is used in combination with a body including a light source, a display plane illuminated with light from the light source, and a projection optical system which projects light from the display plane, and projects the light from the display plane, which is projected from the projection optical system, toward an illumination-targeted plane. The projection unit includes: a negative power convex angle-widening mirror which reflects light forming an image plane of the display plane, the image plane being inclined to the display plane, for angle-widening.

A combination of the projection unit and the body allows an extremely short distance ultra-short projection and the body detached from the projection unit allows a middle and long distance projection independently. Here, since the light forming the image plane sufficiently inclined to the display plane or the optical axis (that is, an image plane sufficiently inclined to a normal line of the optical axis or a plane perpendicular to the optical axis) is reflected for angle-widening by the angle-widening mirror provided in the projection unit, it is possible to achieve a satisfactory ultra-short projection with an aberration such as a distortion suppressed without employing an eccentric optical system. In addition, by widening an angle of light forming an image by reflection from the angle-widening mirror, it is possible to reduce a chromatic aberration due to the angle-widening. Accordingly, it is possible to provide a projector which is capable of display of an image by an extremely short distance ultra-short projection and display of an image by a middle and long distance projection.

In a specific aspect of the projection unit, the projection unit may further include an image plane control optical system in which the light projected from the projection optical system is light forming the image plane of the display plane.

In another aspect of the invention, the projection unit may further include a variable magnification optical system which converts a magnification of an image forming the image plane of the display plane, the image plane being inclined to the display plane.

An interactive board related to one aspect of the invention includes: the above-described projector; and a screen display unit which includes the illumination-targeted plane and allows different information to be written in the illumination-targeted plane, wherein the body of the projector including the projection optical system is attachable or detachable.

The interactive board displays an image on the screen display unit by an ultra-short projection from the projector having a combination of the body and the projection unit. The interactive board can suppress a size in a depth direction by employing the configuration for the ultra-short projection. In addition, the body including the projection optical system can be attached to and detached from the interactive board and high generality and convenience can be secured by allowing a middle and long distance projection by the body alone. The interactive board can achieve reduced weight, power consumption and costs by application of the projector for an enlargement projection. Accordingly, it is possible to provide an interactive board with reduced weight, power consumption and costs and suppressing a depth size with increased convenience.

A third aspect of the invention is directed to a projector including the same body and projection unit as the projector of the first aspect, wherein the projection unit includes a variable magnification optical system which converts a magnification of an image by the image light; and an angle-widening mirror which reflects the image light from the variable magnification optical system for angle-widening, and wherein the variable magnification optical system converts a magnification of an image forming an image plane inclined to an optical axis of the projection optical system (that is, an image plane sufficiently inclined to a normal line of the optical axis or a plane perpendicular to the optical axis). That is, the projector of the third aspect of the invention includes: a body including a projection optical system which projects image light; and a projection unit which projects the image light projected from the projection optical system toward an illumination-targeted plane, wherein the projection unit includes a variable magnification optical system which converts a magnification of an image by the image light and an angle-widening mirror which reflects the image light from the variable magnification optical system for angle-widening, and wherein the variable magnification optical system converts a magnification of an image forming an image plane inclined to an optical axis of the projection optical system.

A fourth aspect of the invention is directed to a projector including the same body and projection unit as the projector of the first aspect, wherein the projection optical system acts as a variable magnification optical system which converts a magnification of an image by the image light, and wherein the variable magnification optical system converts a magnification of an image forming an image plane inclined to an optical axis of the projection optical system (that is, an image plane sufficiently inclined to a normal line of the optical axis or a plane perpendicular to the optical axis). That is, the projector of the fourth aspect of the invention includes: a body including a projection optical system which projects image light; and a projection unit which projects the image light projected from the projection optical system toward an illumination-targeted plane, wherein the projection unit includes an angle-widening mirror which reflects the image light from the projection optical system for angle-widening, wherein the projection optical system acts as a variable magnification optical system which converts a magnification of an image by the image light, and wherein the variable magnification optical system converts a magnification of an image forming an image plane inclined to an optical axis of the projection optical system.

The projectors of the third and fourth aspects each have a combination of the projection unit and the body for an extremely short distance ultra-short projection. The body may be detached from the projection unit to allow a middle and long distance projection independently. By converting a magnification of an image inclined to the optical axis and then widening angle of the image, it is possible to achieve an ultra-short projection without employing an eccentric optical system. In addition, by widening an angle of image light by reflection from the angle-widening mirror, it is possible to reduce a chromatic aberration due to the angle-widening. Accordingly, it is possible to provide a projector which is capable of display of an image by an extremely short distance ultra-short projection and display of an image by a middle and long distance projection.

In a specific aspect of the invention, in the projectors of the third and fourth aspects of the invention, when the image light is projected from the projection optical system without passing through the projection unit, assuming that an image forming range where an image forming an image plane substantially perpendicular to the optical axis is formed is a first range and a range other than the first range in an optical path of the image light is a second range, the projection optical system may project the image light forming an image plane inclined to the optical axis in the second range. This allows the body to use the first range for a middle and long distance projection and to use the second range for an ultra-short projection.

In another aspect of the invention, the body may be attached to or detached from the projector. Accordingly, the body can be taken out of the projector to allow a middle and long distance projection.

In another aspect of the invention, the projection optical system may be switched between a first mode for displaying an image by the body alone and a second mode for displaying an image by a combination of the body and the projection unit. This allows switching between a case where an image of an image plane perpendicular to the optical axis is obtained in the first mode and a case where an image of an inclined image plane is obtained in the second mode.

In another aspect of the invention, the projection optical system, the variable magnification optical system and the angle-widening mirror may be arranged with the optical axes thereof substantially coincided with one another. This facilitates adjustment of optical systems and machining of optical elements to obtain desired optical performance. In particular, this facilitates alignment of the body with the projection unit.

In another aspect of the invention, the projection optical system, the variable magnification optical system and the angle-widening mirror may constitute a shift optical system which shifts a flux of the image light from the optical axes and travels the shifted flux. This can travel angle-widened light to the illumination-targeted plane while avoiding interference between the image light reflected by the angle-widening mirror and optical elements on the optical axis.

A projection unit related to one aspect of the invention is used in combination with a body including a projection optical system which projects image light, and projects the image light projected from the projection optical system toward an illumination-targeted plane. The projection unit includes: a variable magnification optical system which converts a magnification of an image by the image light projected from the projection optical system; and an angle-widening mirror which reflects the image light from the variable magnification optical system for angle-widening, wherein the variable magnification optical system converts a magnification of an image forming an image plane inclined to a normal line of an optical axis of the projection optical system. Accordingly, it is possible to provide a projection unit which is capable of display of an image by an extremely short distance ultra-short projection and display of an image by a middle and long distance projection.

In another aspect of the invention, in the projection unit of the aspect, the variable magnification optical system and the angle-widening mirror may be arranged with the optical axes thereof substantially coincided with each other. This facilitates adjustment of optical systems and machining of optical elements to obtain desired optical performance.

In another aspect of the invention, the angle-widening mirror may fold back the image light such that the image plane is substantially parallel to the illumination-targeted plane. This can obtain an image of an image plane substantially perpendicular to the optical axis on the illumination-targeted plane.

An interactive board related to one aspect of the invention includes: one of the projectors of the third and fourth aspects; and a screen display unit which displays an image by image light incident from the projector and allows writing on a display plane of the image, wherein the body of the projector including the projection optical system which projects the image light is attachable or detachable.

The interactive board of the aspect displays an image on the screen display unit by an extremely short distance ultra-short projection from the projector having a combination of the body and the projection unit. The interactive board can suppress a size in a depth direction by employing the configuration for the extremely short distance ultra-short projection. In addition, the body including the projection optical system can be attached to and detached from the interactive board and high generality and convenience can be secured by allowing a middle and long distance projection by the body alone. The interactive board can reduce weight, power consumption and costs by application of the projector for an enlargement projection. Accordingly, it is possible to provide an interactive board capable of reducing weight, power consumption and costs and suppressing a depth size with increased convenience.

BRIEF DESCRIPTION OF THE DRAWINGS

The invention will be described with reference to the accompanying drawings, wherein like numbers reference like elements.

6D is a schematic view illustrating an angle-widening using a concave lens.

FIG. 7A is a view illustrating a projection by a master lens alone, FIG. 7B is a view illustrating fold-back of a light ray by a plane mirror, FIG. 7C is a view illustrating proximity and mirror deformation and FIG. 7D is a view illustrating an aspheric shape of an aspheric mirror.

DESCRIPTION OF EXEMPLARY EMBODIMENTS

Hereinafter, embodiments of the invention will be described in detail with reference to the drawings.

First Embodiment

Figure 1:
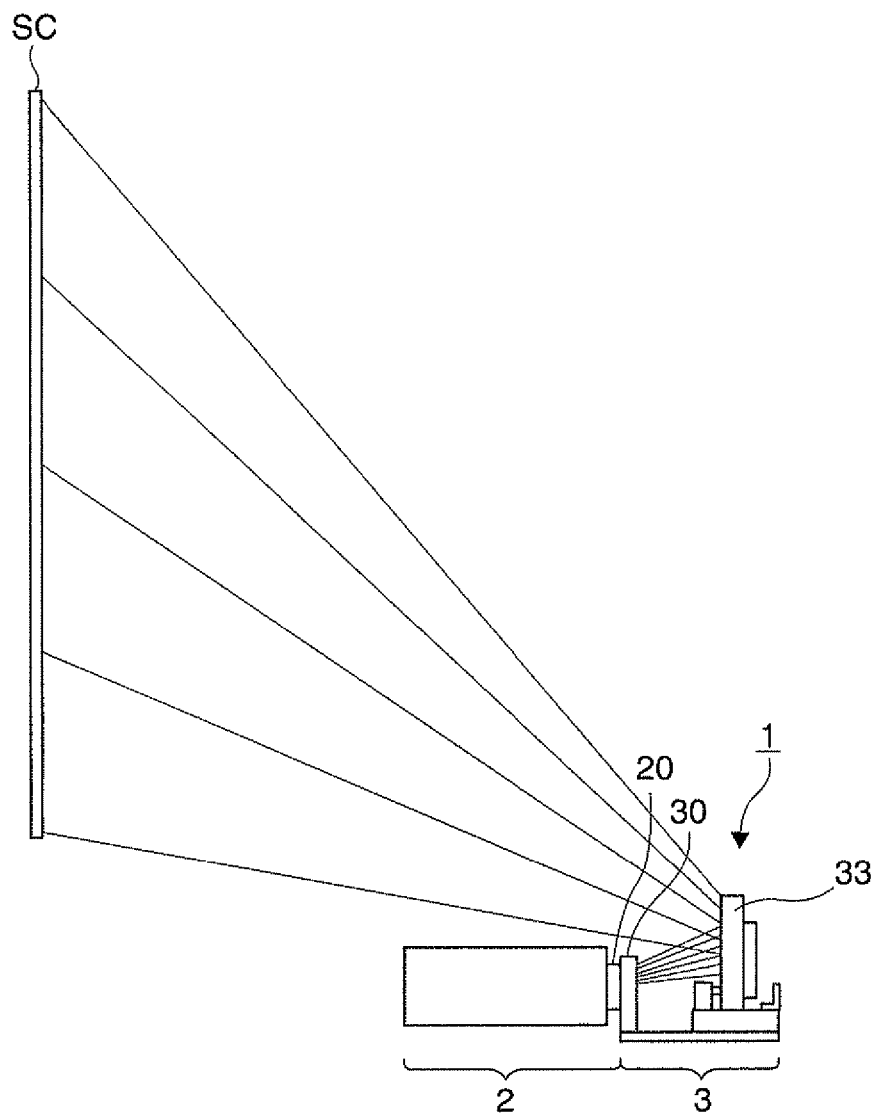
FIG. 1 is a view showing a general configuration of a projector according to a first embodiment of the invention.

FIG. 1 is a view showing a general configuration of a projector 1 according to a first embodiment of the invention. The projector 1 includes a body 2 and a projection unit 3. The body 2 emits image light based on an image signal. The projection unit 3 projects the image light from the body 2 toward an illumination-targeted plane of a screen SC.

Figure 2:
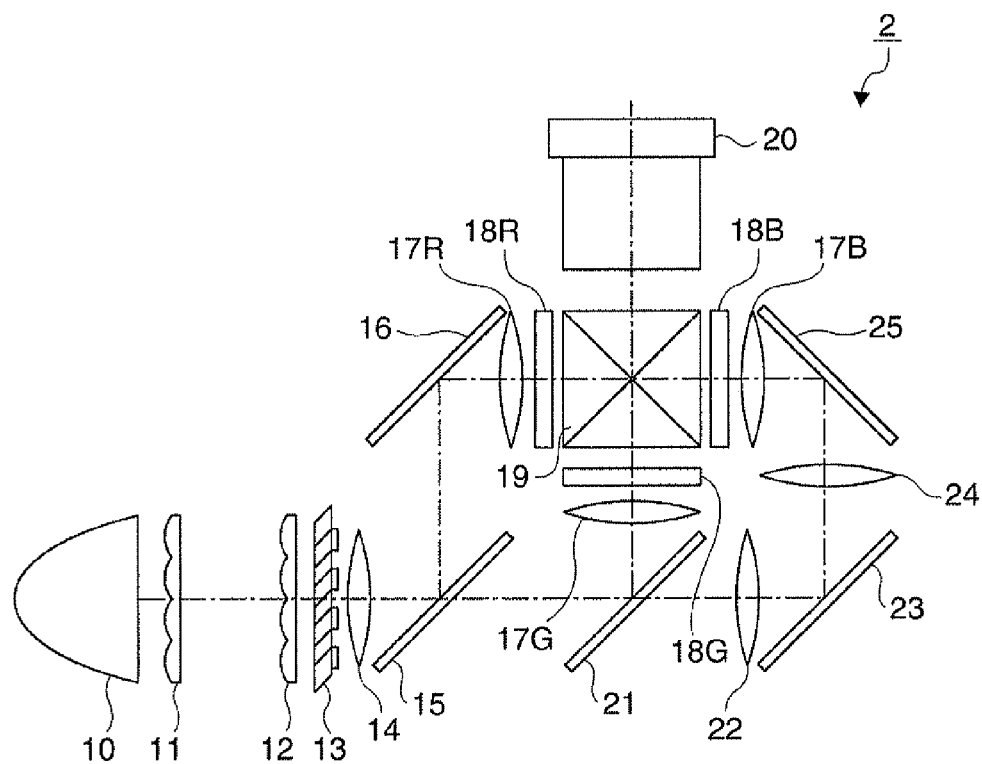
FIG. 2 is a view showing a general configuration of a body of the projector.

FIG. 2 is a view showing a general configuration of the body 2. A light source 10 is, for example, an ultrahigh pressure mercury lamp and emits a light ray including R, G and B light. In this embodiment, instead of the ultrahigh pressure mercury lamp, the light source 10 may be a discharging light source or a solid state light source such as an LED or a laser. A first integrator lens 11 and a second integrator lens 12 each have a plurality of lens elements in the form of an array. The first integrator lens 11 divides a light flux from the light source 10 into a plurality of smaller light fluxes. Each of the lens elements of the first integrator lens 11 condenses the light flux from the light source 10 in the vicinity of the lens elements of the second integrator lens 12. The lens elements of the second integrator lens 12 and a superimposing lens 14 form an image of the lens elements of the first integrator lens 11 on liquid crystal display panels 18R, 180 and 18B. With this configuration, the entire desired regions (image display planes) of the liquid crystal display panels 18R, 18G and 18B are illuminated with the light from the light source 10 having substantially uniform brightness.

A polarization conversion element 13 converts the light from the second integrator lens 12 into predetermined linear polarized light. The superimposing lens 14 superimposes images of the lens elements of the first integrator lens 11 onto illumination planes of the liquid crystal display panels 18R, 18G and 18B. A first dichroic mirror 15 reflects R light incident from the superimposing lens 14 and transmits G and B light incident therefrom. The R light reflected by the first dichroic mirror 15 is incident into the liquid crystal display panel 18R, which is a spatial light modulator, through a reflection mirror 16 and a field lens 17R. The liquid crystal display panel 18R modulates the R light for an image signal.

A second dichroic mirror 21 reflects G light incident from the first dichroic mirror 15 and transmits B light incident therefrom. The G light reflected by the second dichroic mirror 21 is incident into the liquid crystal display panel 18G, which is a spatial light modulator, through a field lens 17G. The liquid crystal display panel 18G modulates the G light for an image signal. The B light transmitted through the second dichroic mirror 21 is incident into the liquid crystal display panel 18B, which is a spatial light modulator, through relay lenses 22 and 24, reflection mirrors 23 and 25 and a field lens 17B. The liquid crystal display panel 18B modulates the B light for an image signal. A cross dichroic prism 19, which is a color combination optical system, combines the light modulated by the liquid crystal display panels 18R, 18G and 18B into image light which is then propagated into a projection lens 20. The projection lens 20 acts as a projection optical system which projects the image light from the body 2. As spatial light modulators, reflection type liquid crystal display panels may be used instead of the transmission type liquid crystal display panels 18R, 18G and 18B. In addition, any reflection type devices (for example, micro mirror devices and the like) may be used as spatial light modulators.

Figure 3A:
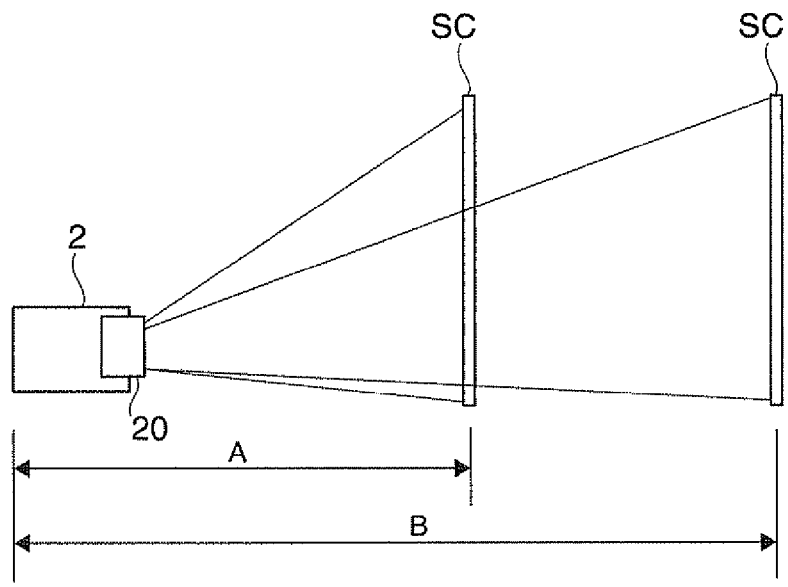
FIG. 3A is a schematic view illustrating a projection by the body alone and FIG. 3B is a schematic view illustrating a projection by a combination of the body and a projection unit.

FIG. 3A is a schematic view illustrating a projection distance when image light is projected by the body 2 alone. The body 2 is configured to be attachable to or detachable from the projector 1. The body 2 alone, detached from the projector 1, illuminates the illumination-targeted plane with an image formed by the image light projected from the projection lens 20. In this case, the body 2 is installed to face the projection lens 20 toward the screen SC. It is here assumed that the body 2 can be focused on the same size screen in a range of a distance A to a distance B (A<B).

Figure 3B:
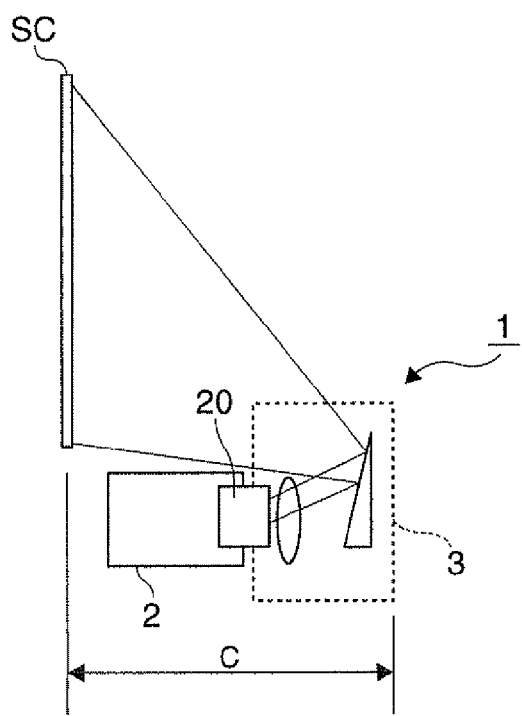

FIG. 3B is a schematic view illustrating a projection distance when image light is projected by a combination of the body 2 and the projection unit 3. The projector 1 illuminates the illumination-targeted plane with an image by projecting the image light emitted from the projection lens 20 by means of the projection unit 3. In this case, the body 2 is mounted on the projector 1 such that the body 2 faces the projection lens 20 toward the projection unit 3 in the opposite side to the screen SC. The projector 1 can make a projection at a distance C which is shorter than the distance A.

Figure 4:
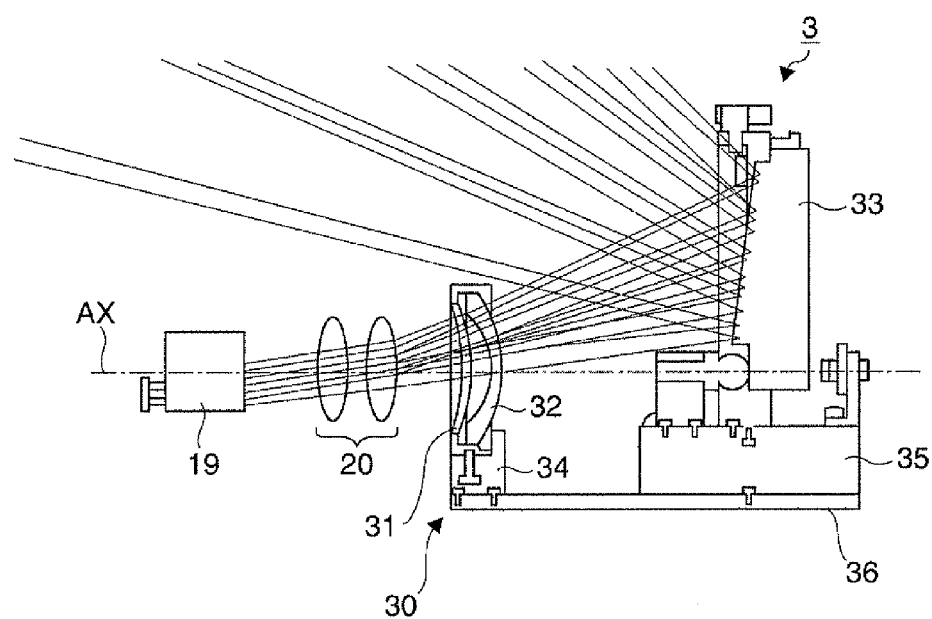
FIG. 4 is a view showing a section of the projection unit and a light ray of image light.

FIG. 4 is a view showing a section of the projection unit 3 and a light ray of image light before and after the image light is incident into the projection unit 3. The projection unit 3 includes, as its optical elements, a first lens 31, a second lens 32 and an angle-widening mirror 33. The first lens 31 and the second lens 32 are placed to face the projection lens 20. Both of the first lens 31 and the second lens 32 are, for example, spherical lenses. The first lens 31 and the second lens 32 are supported on a board 36 by a lens support 34.

The angle-widening mirror 33 is placed at a position into which image light from the first lens 31 and the second lens 32 is incident. The angle-widening mirror 33 is an aspheric mirror which reflects image light to widen an angle of the image light. The angle-widening mirror 33 is supported on the board 36 by a mirror support 35. The first lens 31, the second lens 32 and the angle-widening mirror 33 are positioned and fixed through the common board 36.

The angle-widening mirror 33 has a shape which is substantially rotation-symmetrical with respect to a center axis (optical axis), for example, an aspheric shape resulting from a partial cutting of a cone. The center axis of the angle-widening mirror 33 coincides with an optical axis AX of the projection lens 20. Optical axes of the first lens 31 and the second lens 32 also coincide with the optical axis AX of the projection lens 20. In this manner, the projection lens 20, the first lens 31, the second lens 32 and the angle-widening mirror 33 are placed with their optical axes coincided with one another.

The projection lens 20, the first lens 31, the second lens 32 and the angle-widening mirror 33 propagate light modulated on an image signal with the light shifted to a particular side. In more detail, in an image side, the light is propagated with the light shifted to a vertical upper side which is a particular side with respect to the optical axis AX. A center normal line of an image plane virtually formed on an incident surface of the cross dichroic prism 19 (corresponding to a center normal line of an image displaying plane region of a display plane DS, which will be described later) is parallel to the optical axis AX and is in a vertical lower side which is opposite to the particular side with respect to the optical axis AX.

In describing the projection lens 20 and the projection unit 3, an object side refers to a liquid crystal display side and an image side refers to an image plane IMG side or a screen SC side.

The body 2 may be, for example, completely separated from the projection unit 3 and is attachable to or detachable from the projector 1. Alternatively, the body 2 may be moved within the projector 1 and may be integrated with the projection unit 3. For example, in case of middle and long distances, the body 2 may be configured to be moved to a position at which image light projected from the projection lens 20 is not blocked by the projection unit 3. If the body 2 is integrated with the projection unit 3, position adjustment therebetween can be omitted even when the projector 1 is transported, which may result in improvement of user's convenience. Of course, with the body 2 fixed, the projection unit 3 may be configured to be moved to a position at which image light projected from the projection lens 20 is not blocked by the projection unit 3.

Figure 5:
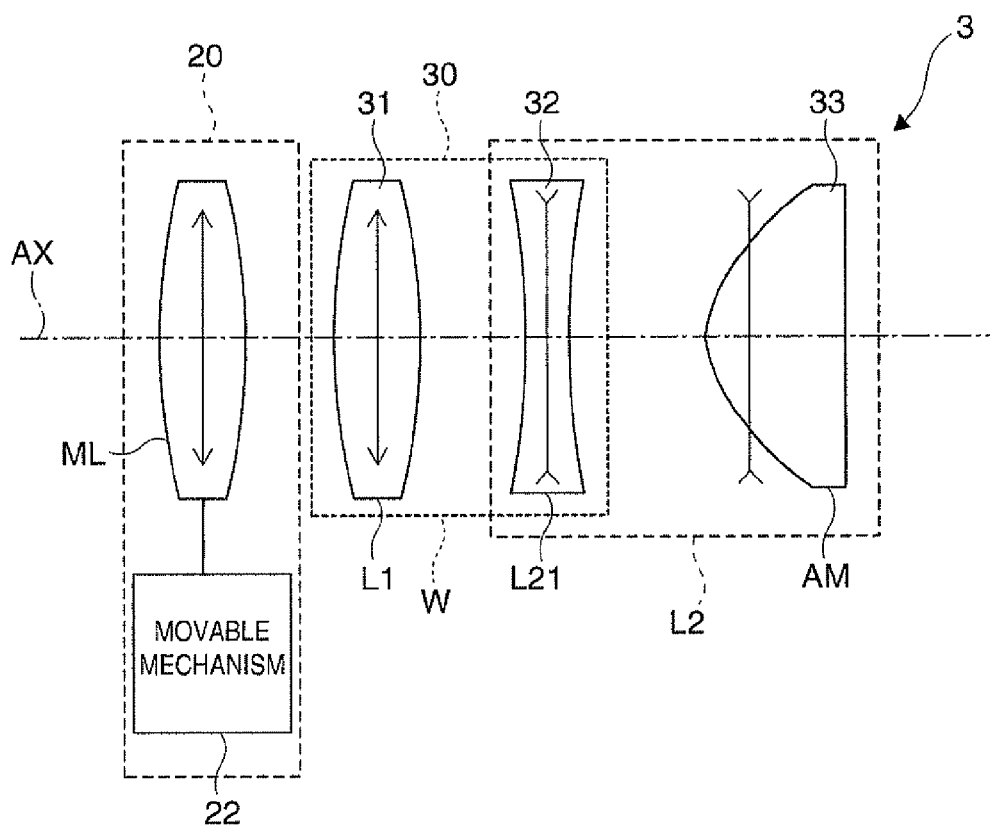
FIG. 5 is a schematic view illustrating functions of various optical elements shown in FIG. 4.

FIG. 5 is a schematic view where various optical elements constituting the projection optical system of the projector 1 are classified in terms of function for the sake of convenience of description. A projection master lens ML alone corresponds to the projection lens 20 which allows a middle and long distance projection as shown in FIG. 3A. A combination of a positive power optical element L1 and a negative power optical element L2 corresponds to the projection unit 3 which allow an ultra-short projection, as shown in FIG. 3B, by connection with the projection lens 20. The optical element L1 corresponds to the first lens 31 of an object side in a refraction optical system 30 constituting the projection unit 3. The optical element L2 corresponds to a combination of the second lens 32 of an image side in the refraction optical system 30 and the angle-widening mirror 33 which is a reflection optical system constituting the projection unit 3. The second lens 32 in the optical element L2 corresponds to a negative power optical element L21 and the angle-widening mirror 33 in the optical element L2 corresponds to an aspheric mirror AM. The refraction optical system 30 including the first lens 31 and the second lens 32 corresponds to an enlargement optical system W which enlarges an image plane of light from the master lens ML. In addition, a movable mechanism 22 is attached to the projection lens 20 and a position of the projection lens 20 can be relatively changed by manual or electricity when the projection unit 3 is attached/detached.

Figure 6A:
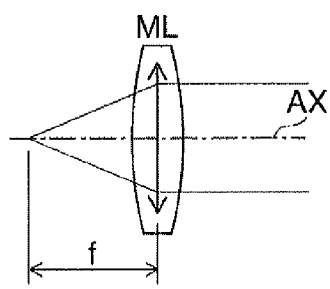
FIG. 6A is a schematic view showing a master lens.

Next, functions of various optical elements in the ultra-short projection by the projector 1 will be described. For example, it is assumed that a focus length f of the master lens ML, as shown in FIG. 6A, is shortened by an addition of an optical element. In order to shorten the focus length, it is considered to add afocal optical system as an optical system which increases an image magnification.

Figure 6B:
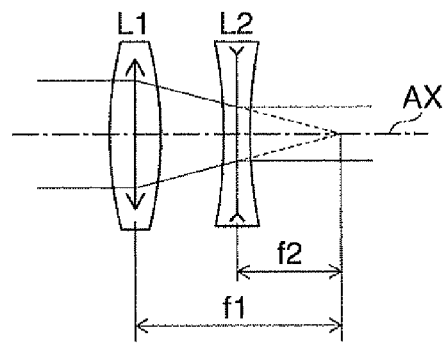
FIG. 6B is a schematic view showing an exemplary afocal optical system.

The afocal optical system is constituted by, for example, a combination of a positive power optical element L1 and a negative power optical element L2, as shown in FIG. 6B. The optical element L1 is, for example, a convex lens. The optical element L2 is, for example, a concave lens and is placed at an emission side of the optical element L1. The optical element L1 and the optical element L2 are positioned to have the same focus. The optical element L1 having a focus length f1 and the optical element L2 having a focus length f2 constitute a Galilean telescope having a defined magnification ($-f1/f2$).

Figure 6C:
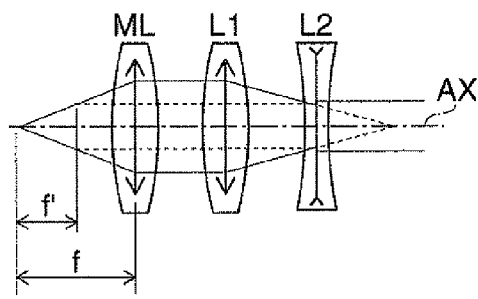
FIG. 6C is a schematic view showing a combination of the master lens and the afocal optical system, FIG.
Figure 6D:
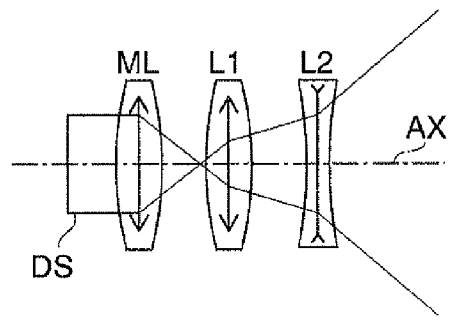
FIG. 6E is a schematic view illustrating an angle-widening using a convex mirror and FIG. 6F is a schematic view illustrating a shift optical system.

As shown in FIG. 6C, placement of the master lens ML at an incident side of the afocal optical system constituted by the optical element L1 and the optical element L2 provides a front converter having the magnification ($-f1/f2$) (in this case, a wide converter for angle-widening). Thus, the focus length f when using only the master lens ML is reduced to f' (=f×(−f1/f2)). Since a chromatic aberration may be more apparent with increase in angle-widening (increase in an afocal magnification) by the optical system constituted by lenses, an additional lens for reduction of the chromatic aberration may be used. As shown in FIG. 6D, for example, if a 130° or more of angle-widening is to be realized by extending a curvature of the optical element L2 which is a concave lens, it is difficult to reduce a chromatic aberration due to the optical element L2 even when a lens for reduction of the chromatic aberration is used.

Figure 6E:
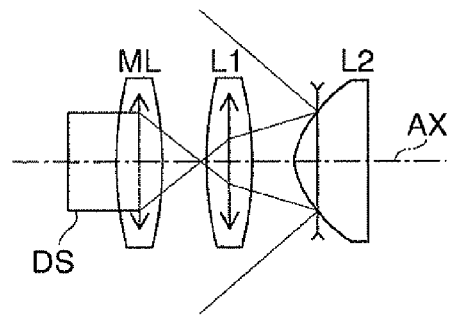
Figure 6F:
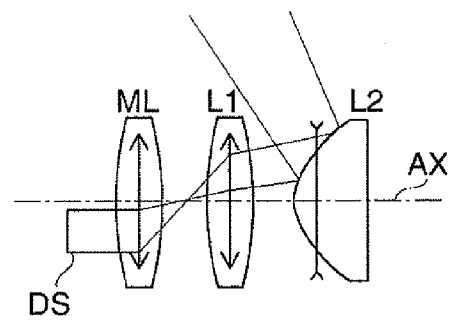

Accordingly, as shown in FIG. 6E, a mirror having a convex plane may be used as the negative power optical element L2 instead of the concave lens. The chromatic aberration is reduced by using such a mirror in a portion where a change in a light ray angle increases. The mirror used as the optical element L2 includes a function of folding-back light by reflection in addition to the angle-widening. Accordingly, as shown in FIG. 6F, with the master lens ML, the optical element L1 and the optical element L2 as a shift optical system, an interference of light ray in the vicinity of the optical axis AX can be avoided by removing the display plane DS from the optical axis AX. The display plane DS corresponds to each of image display planes in the liquid crystal display panels 18R, 18G and 18B of the body 2 of this embodiment, on which an image is formed based on an image signal.

When light is projected onto the screen SC by using the master lens ML alone, as shown in FIG. 7A, a light ray is folded-back by inserting a simple plane mirror PM in an optical path, as shown in FIG. 7B. Proximity between the folded-back portion of the light ray and the screen SC requires a deformation to bend the plane mirror PM of the folded-back portion, as shown in FIG. 7C. An aspheric mirror AM obtained by the deformation of the plane mirror PM is obtained by continuing a reflection plane so that the light ray from the master lens ML can be reflected on the approximated screen SC. The aspheric mirror AM obtained in this way has an aspheric shape to increase a curvature as it approaches the optical axis AX, as shown in FIG. 7D. Accordingly, an image can be formed on the approximated screen SC, that is, the illumination-targeted plane, by the ultra-short projection.

Figure 8:
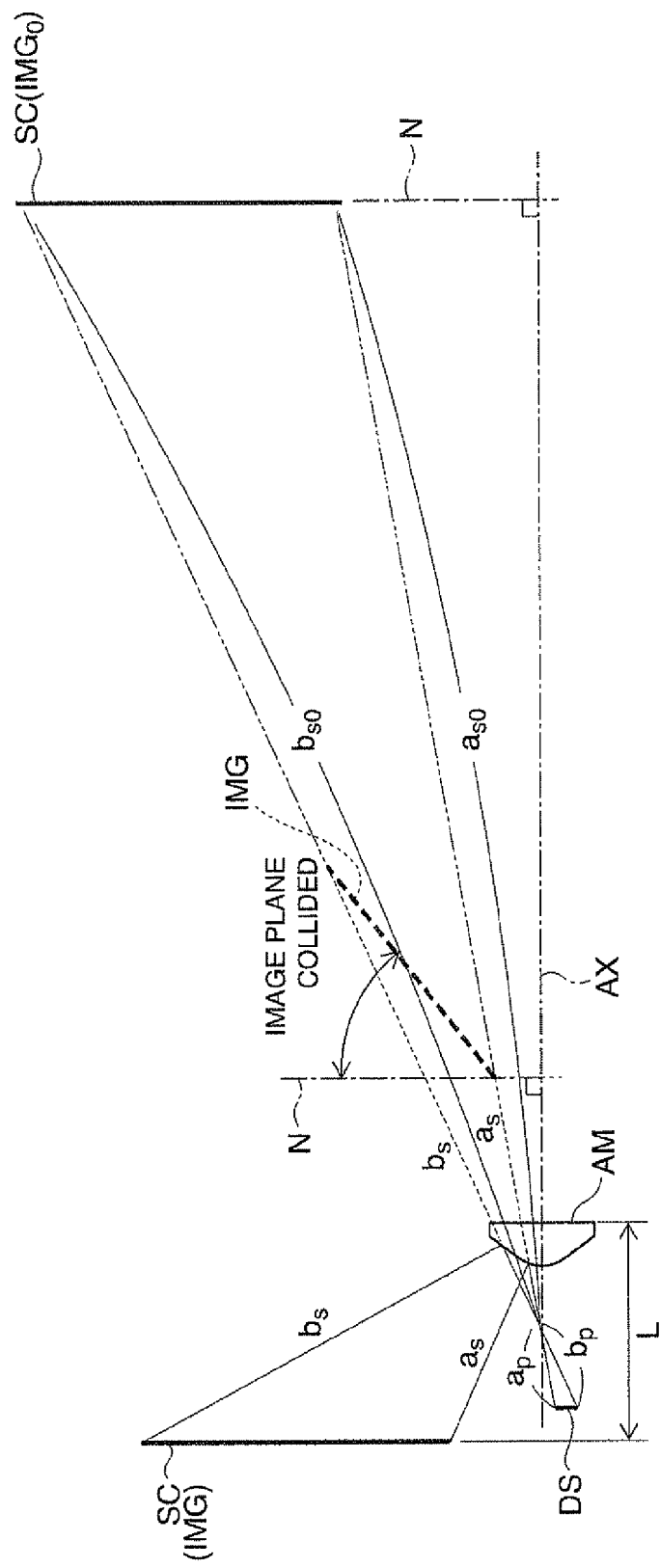
FIG. 8 is a view illustrating a relationship between an image height and a light ray distance.

FIG. 8 is a view illustrating a relationship between an image height and a light ray distance. An image height refers to a vertical height of an image with respect to the optical axis AX. In case of a general middle and long distance projection by the master lens ML, a magnification (as0/ap) of a portion providing the minimum image height is close to a magnification (bs0/bp) of a portion providing the maximum image height and an image plane IMG0 is about perpendicular to the optical axis AX (about parallel to the display plane DS). In contrast, in case of an extremely short distance ultra-short projection by a combination of the master lens and the projection unit 3, as a projection distance L between the screen SC and the aspheric mirror AM gets short, a magnification (as/ap) of a portion providing the minimum image height is greatly different from a magnification (bs/bp) of a portion providing the maximum image height. If the light ray goes straight without any optical element L2, that is, the aspheric mirror AM, an image plane IMG is formed to be greatly inclined to a normal line N of the optical axis AX, as indicated by a dashed line in the figure. The aspheric mirror AM acts to erect or invert the image plane IMG perpendicular to the optical axis AX (parallel to the display plane DS) by reflecting image light. By erecting or inverting the image plane IMG parallel to the display plane DS, an image can be properly formed on the illumination-targeted plane of the screen SC parallel to the display plane DS.

The aspheric mirror AM has an aspheric shape represented by the following polynomial equation h. In this equation, y represents a height of an image from the optical axis AX (image height), c represents a curvature of a spherical surface with respect to a shape of the aspheric mirror AM, k represents a conic constant, and $A_2, A_4, A_6, A_8, A_{10}, \ldots$ represent correction terms.

$$h = \frac{cy^2}{1 + \sqrt{1 - (1+k)c^2 y^2}} + A_2 y^2 + A_4 y^4 + A_6 y^6 + A_8 y^8 + A_{10} y^{10} + \ldots \quad \text{Equation 1}$$

The fractional term in the above equation represents a reference aspheric shape. If k=0, this term represents a spherical shape. The correction terms represent variations from the reference aspheric shape. The above equation represents an aspheric shape which is rotation-symmetrical with respect to the center axis although the reference aspheric shape is corrected by the correction terms. In the polynomial equation h, the number of correction terms is not particularly limited.

In case of angle-widening of image light, typically, since an aberration such as a distortion is more likely to occur in a farther peripheral portion from the optical axis AX, there is a need of a design to greatly reduce an aberration, particularly in peripheral portions. In this embodiment, by including the correction terms in the polynomial equation h representing the shape of the aspheric mirror AM, it is possible to correct a shape based on the height y from the optical axis AX for a quadratic curve defined by c and k. By multiplying each correction term by a factorial of y, a more effective correction can be made by an increased amount of y. Accordingly, even when the master lens ML is made to be short focused by the projection unit 3 including the aspheric mirror AM and the like, and it is possible to implement a high performance optical system with little aberration such as a distortion in the peripheral portions. In addition, an equation representing a shape of the aspheric mirror AM is not limited to that described in this embodiment but may be appropriately modified. In addition, the shape of the angle-widening mirror 33 may be a free curved surface which may be expressed by an XY polynomial equation. Further, the angle-widening mirror may be a positive power concave mirror instead of the negative power convex mirror.

Figure 9:
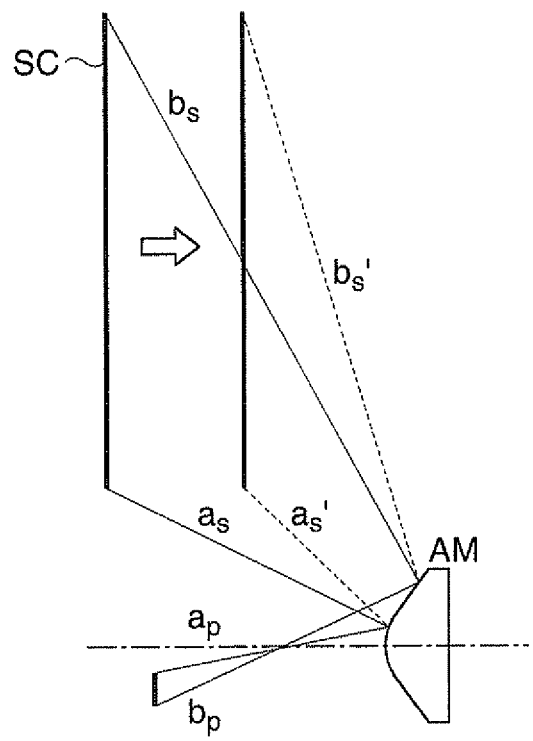
FIG. 9 is a view illustrating proximity and a change in light ray distance.

As shown in FIG. 9, as the screen SC gets closer to the aspheric mirror AM, a light ray distance is changed from bs to bs' in the portion providing the maximum image height. An effective correction can be made by adjusting the polynomial equation representing the shape of the aspheric mirror AM such that the light ray distance is changed in this manner in portions providing a large image height. As the proximity is progressing, there is a need to make a correction to change the light ray distance from as to as' in portion providing a small image height in addition to the portions providing the large image height. As the image height becomes smaller, it becomes more difficult to make a correction by the polynomial equation of the aspheric mirror AM. Accordingly, in this embodiment, an aberration correction is made for the portions providing the small image height using an optical property of the master lens ML instead of the aspheric mirror AM.

Figure 10A:
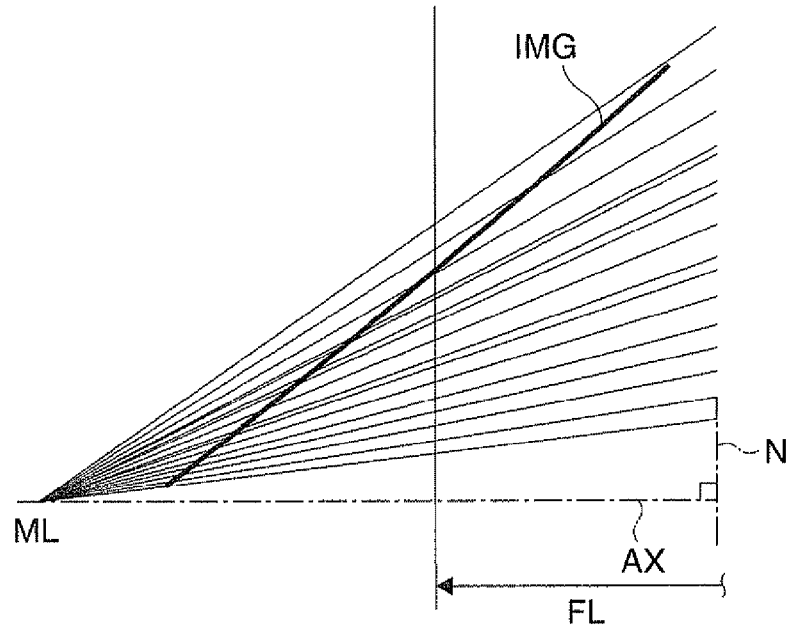
FIG. 10A is a view showing an example of simulation of an inclined image plane for an ultra-short projection and FIG. 10B is a view illustrating an optical property of a master lens.

FIG. 10A is a view showing an example of simulation of the inclined image plane IMG for an ultra-short projection in a comparative example. For the ultra-short projection to form an image using only the master lens ML shown in FIG. 10A, the inclined image plane IMG is collapsed up to a range FL of a focus length for the general middle and long distance projection. When light from the master lens ML is image formed on the screen SC via the aspheric mirror AM, the image plane IMG becomes parallel to the display plane DS and an image can be properly projected on the screen SC parallel to the display plane DS. However, if this projection of the image plane IMG is made on the screen SC within the range FL of the focus length for the general middle and long distance projection using only the master lens ML, the image plane is likely to be inclined to the illumination-targeted plane (the plane parallel to the display plane DS), which results in difficulty in forming an image on the illumination-targeted plane. Accordingly, this embodiment employs the configuration that, after obtaining an inclined image plane at a position relatively close to the master lens ML (a range of a master lens ML side rather than the range FL of the focus length for the general middle and long distance projection) using the master lens ML, the image thereof is enlarged by the enlargement optical system W of the projection unit 3 and is parallelized to the display plane DS using the aspheric mirror AM, thereby projecting the image onto the screen SC parallel to the proximate display plane DS.

Figure 10B:
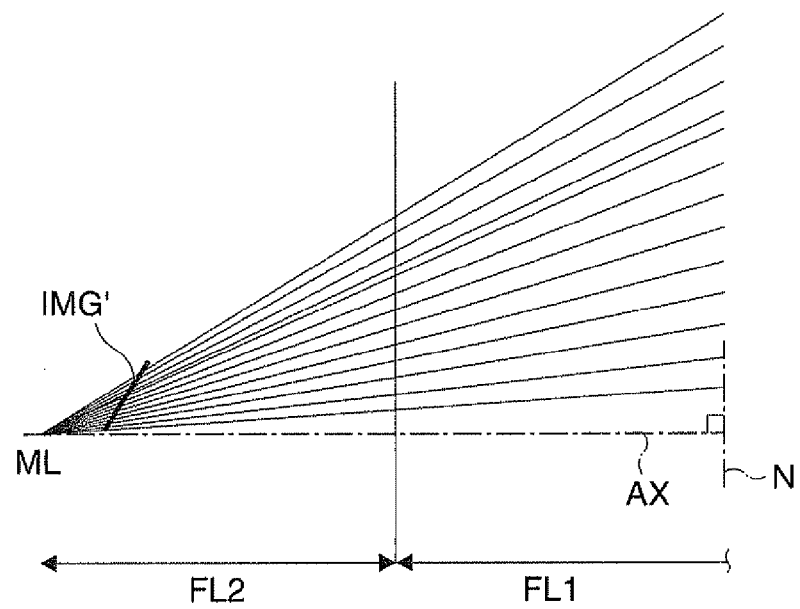

FIG. 10B is a view illustrating an optical property of the master lens ML in this embodiment. The image plane by the master lens ML is erected or inverted substantially perpendicular to the optical axis AX (substantially parallel to the display plane DS) in an image formation range which is farther from a predetermined distance and is inclined to the normal line N in a range which is closer to the predetermined distance. The master lens ML alone makes a middle and long distance projection using a first range FL1 where the image plane is erected or inverted parallel to the display plane DS. In addition, as indicated by a thick line in the figure, the master lens ML makes an image plane IMG' inclined to the normal line N for an extremely short ultra-short projection in a second range FL2 closer to the master lens ML side than the first range FL1. The image plane IMG' enlarged by the enlargement optical system W of the projection unit 3 corresponds to the image plane IMG in the example of simulation shown in FIG. 10A. In other words, the image plane IMG' is scaled down with respect to the image plane IMG shown in FIG. 10A.

Figure 11:
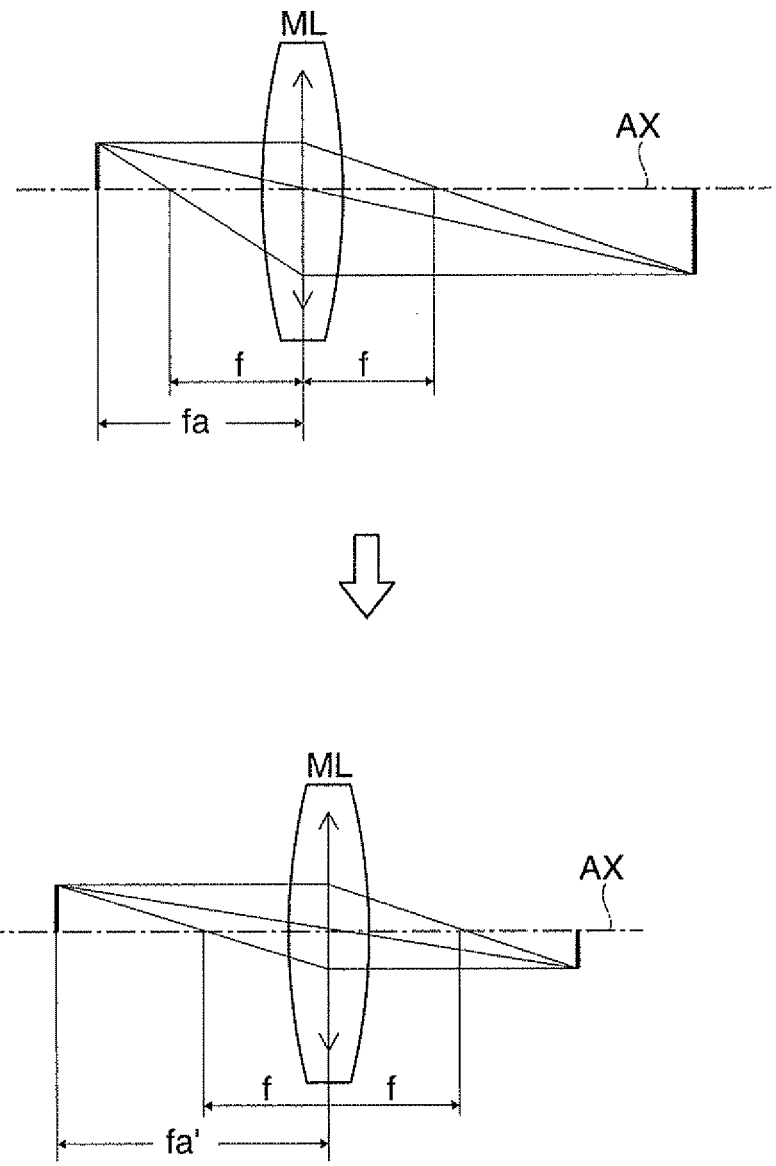
FIG. 11 is a view illustrating a method of obtaining an inclined image plane using a master lens.

FIG. 11 is a view illustrating a method of obtaining an inclined image plane using the master lens ML. The upper part in the figure shows a case where a middle and long distance projection is made with a back focus of fa (a first mode). The first mode is a mode for displaying an image on the illumination-targeted plane by the body 2, that is, the master lens ML alone and corresponds to a normal display state. The lower part in the figure shows a case where an extreme short distance ultra-short projection is made with a back focus of fa' (fa<fa') (a second mode). The second mode is a mode for displaying an image on the illumination-targeted plane by a combination of the body 2 and the projection unit 3 and corresponds to a macro display state.

Figure 12:
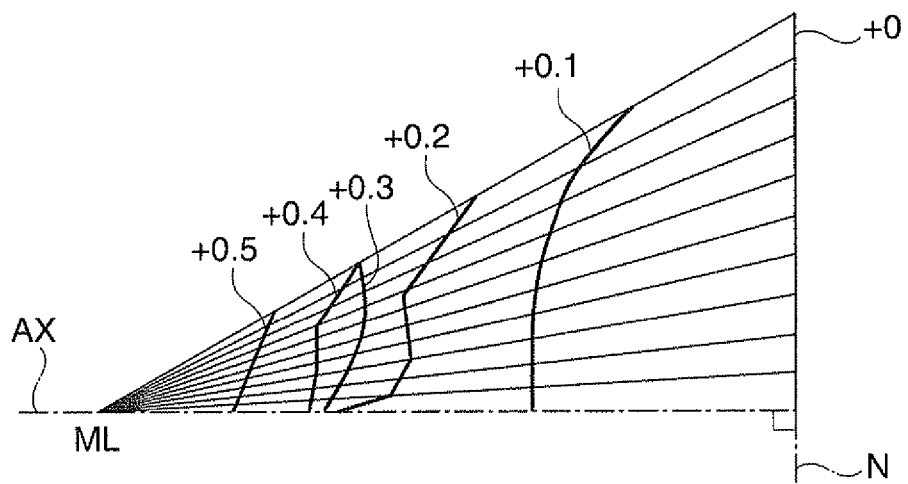
FIG. 12 is a view illustrating a back focus and collapse of an image plane.

In the second mode (the macro display state), the master lens ML is moved in the optical axis AX direction by the movable mechanism 22 shown in FIG. 5 such that aback focus is prolonged with respect to a normal position of the master lens ML in the first mode (the normal display state). If an image formation position at a near axis is moved to the master lens ML side, in general, an image plane by image light away from the optical axis AX is collapsed. For example, as shown in FIG. 12, as a back focus is enlarged from +0, the collapse of the image plane appears randomly and is completely inclined to the normal line N near +0.5.

By preparing a master lens ML for realizing the second mode for the extremely short distance projection, a combination of the body 2 including the master lens ML and the like and the projection unit 3 including the aspheric mirror AM and the like can exhibit a high optical performance. By allowing a mode to be switched over by a simple operation to move the master lens ML in the body 2 in the optical axis AX direction, it is possible to realize a simple and precise configuration with little increase in cost. A method of obtaining the inclined image plane IMG' using the master lens ML is not limited to the case where the master lens ML is moved in the optical axis AX direction. The inclined image plane IMG' may be obtained by changing an inclination of at least one of the lenses constituting the master lens ML. Also in this case, a mode can be switched over by a simple operation.

Figure 13:
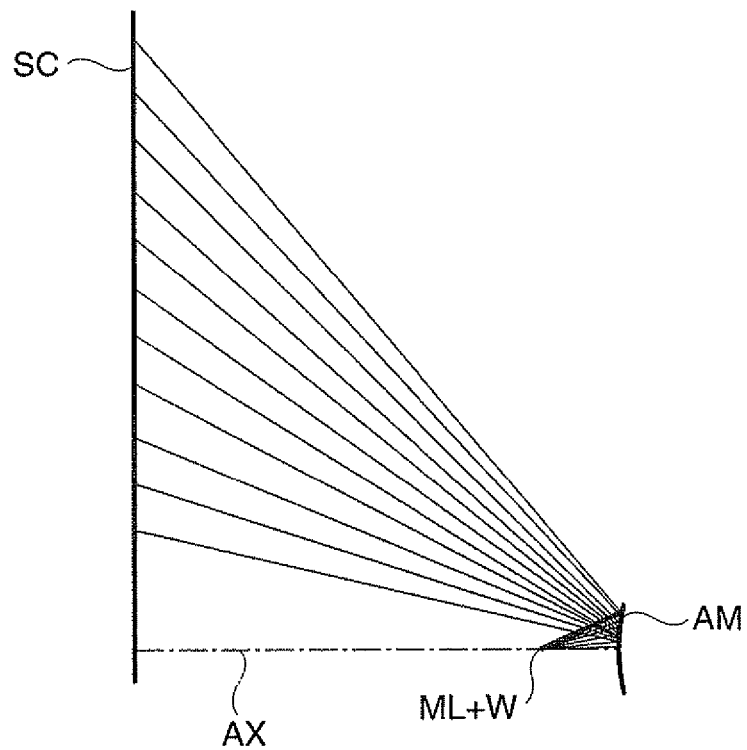
FIG. 13 is a view illustrating image formation on a screen.

In the second mode, the image plane IMG' by the master lens ML is enlarged to the image plane IMG shown in the example of simulation of FIG. 10A by the enlargement optical system W. Image light obtained by enlarging an image of the inclined image plane IMG' by the enlargement optical system W is reflected by the aspheric mirror AM, as shown in FIG. 13, and accordingly, the image is formed on the screen SC substantially perpendicular to the optical axis AX with the image erected or inverted substantially parallel to the display plane DS.

Hereinafter, the functions of the projection unit 3 and the projection lens 20 constituting the projector 1 will be described with reference to FIG. 5. The projection lens 20 corresponding to the master lens ML can form the image plane IMG' (see FIG. 10B) inclined to the normal line N of the optical axis AX. The projection lens 20 has a function of correcting an aberration for, particularly, a portion providing a small image height. The projection unit 3 constituted by the first lens 31, the second lens 32 and the angle-widening mirror 33 acts as a front converter to enlarge an image.

As shown in FIG. 6C, for the front converter, in this embodiment, a focus position is slightly varied by employing the shift optical system, as shown in FIG. 6F. All aberrations due to this variation can be corrected by the angle-widening mirror 33 or may be further reduced by a lens in addition to the angle-widening mirror 33. In addition, the first lens 31 and the second lens 32 constituting the refraction optical system 30 may employ aspheric lenses, instead of the spherical lenses, to provide an aberration correction function. In this manner, by combining a plurality of optical elements having an aberration correction function, it is possible to meet the demand for the use in a high performance optical system. In particular, in a group of lenses constituting the refraction optical system 30, by employing an aspheric lens or a free curved surface lens instead of a spherical lens, it is possible to decrease the number of lenses or make lenses compact. This may result in reduction of costs and compactness of a mirror frame.

The first lens 31 as the positive power optical element L1 and the second lens 32 as the negative power optical element L21 act as the enlargement optical system W to enlarge the inclined image plane IMG' by the projection lens 20 between the projection lens 20 and the angle-widening mirror 33. In other words, the enlargement optical system W including the first lens 31 and the second lens 32 acts as a variable magnification optical system to vary a magnification of an image forming the image plane IMG' inclined to the normal line N of the optical axis AX.

The angle-widening mirror 33 corresponding to the aspheric mirror AM constitutes the second optical element L2 along with the second lens 32. The angle-widening mirror 33 folds back image light such that the image plane IMG (see FIG. 10A) enlarged by the enlargement optical system W is substantially parallel to the illumination-targeted plane of the screen SC. In addition, the angle-widening mirror 33 acts to correct an aberration for, particularly, a portion providing a large image height.

The angle-widening mirror 33 may facilitate an alignment of a different configuration (the projection lens 20 and the refraction optical system 30) with the optical axis AX by taking a shape which is substantially rotation-symmetrical with respect to the center axis. In addition, the angle-widening mirror 33 can be easily prepared with high precision as it can be machined by a lathe or the like. The projector 1 may employ a design method of a typical coaxial optical system by employing a coaxial optical system. Accordingly, it is possible to reduce the number of design processes of an optical system and realize an optical system having a smaller aberration.

Since this embodiment is configured to arrange a plurality of optical elements at predetermines intervals, an assembling operation can easily performed by arranging an optical axis, which may result in high performance. In particular, when the body 2 is attached/detached, there is a need of a precise alignment of the projection lens 20 of the body 2 with various optical elements of the projection unit 3. By setting the optical axis in common, it is possible to make an easy alignment of the optical elements of the body 2 with the optical elements of the projection unit 3. In case of a coaxial optical system, it is possible to smooth a change in optical performance from the optical axis toward its peripheral portions with respect to a change in optical performance in an eccentric optical system. Accordingly, it is possible to provide some degree of margin on arrangement precision and hence realize a configuration appropriate for the present invention.

As is apparent from the above description, it is possible to realize both of the extremely short distance ultra-short projection and the middle and long distance projection using a single projector 1 without deteriorating image quality. The single projector 1 can cover a wide projection range from an extremely short distance to a middle and long distance. The projection unit 3 of this embodiment may be combined with an existing projection type projector. By applying the projection unit 3 to an existing projector including a projection lens which can form an image of an image plane collapsed in the second range FL2 as shown in FIG. 10B, it is possible to realize the same ultra-short projection as in this embodiment.

The projection unit 3 is sufficient if it includes at least the angle-widening mirror 33, and may be appropriately modified. For example, the angle-widening mirror 33 may have a function to contribute to a variable magnification of the second lens 32. In addition, an optical system of the body 2, for example, the projection lens 20, may have the function of the first lens 31 or both of the functions of the first lens 31 and the second lens 32. Also in this case, the projector 1 can make an ultra-short projection.

Example 1

Figure 14A:
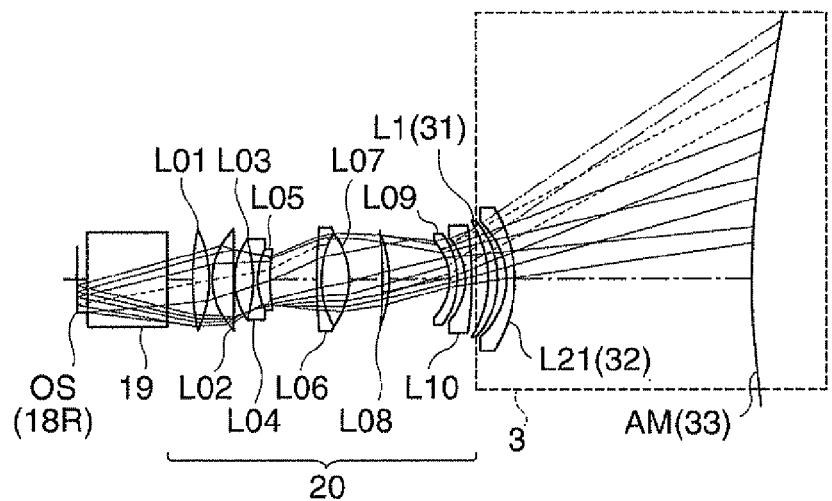
FIG. 14A is a view illustrating an optical system in an example of the first embodiment and FIG. 14B is a view illustrating an ultra-short projection by the optical system in the example.
Figure 14B:
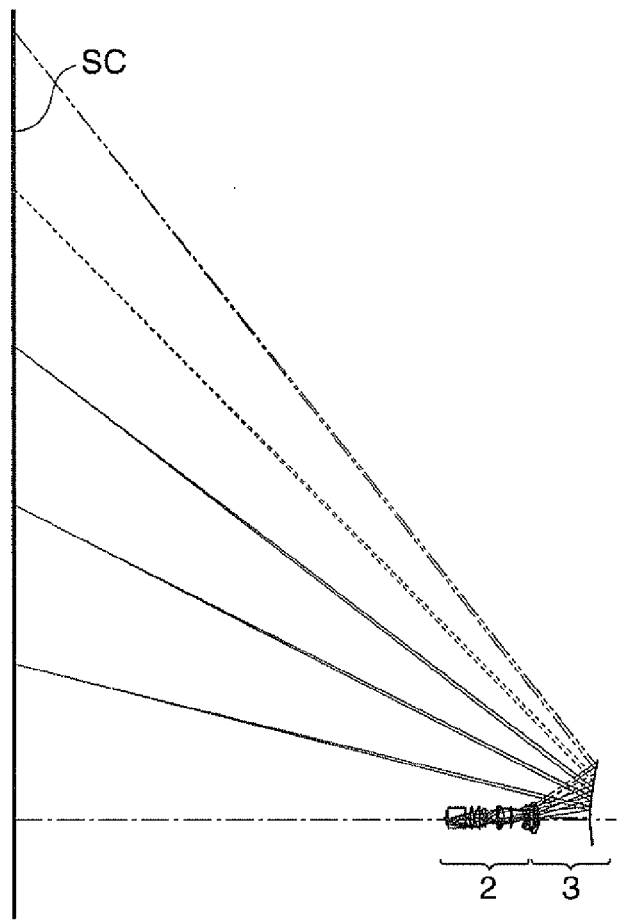

FIGS. 14A and 14B are views illustrating Example 1 of an ultra-short projection by a combination of the projection lens 20 and the projection unit 3 in the second mode. In this example, the projection lens 20 includes lenses L01 to L10. The projection unit 3 includes the first and second lenses 31 and 32 and the angle-widening mirror 33.

The following table 1 shows lens data and the like of Example 1. In this table 1, "plane number" is a sequential number given to a plane of each lens from an object plane OS. "Plane type" is to distinguish between spherical and aspheric or identify a reflection plane, "R" represents a radius of curvature, "D" represents a lens thickness from one plane to another plane or an air space therebetween, "Nd" represents a refractive index for a d line of lens material, and "vd" represents a dispersion of lens material.

TABLE 1

| Plane No | Plane Type | R | D | Nd | vd |
|---|---|---|---|---|---|
| Object | Spherical | Infinite | 3.3057 | | |
| 1 | Spherical | Infinite | 25.7500 | 1.516800 | 64.2 |
| 2 | Spherical | Infinite | 8.0799 | | |
| 3 | Spherical | 153.5530 | 5.4000 | 1.589130 | 61.1 |
| 4 | Spherical | −37.9820 | 1.0000 | | |
| 5 | Spherical | 23.1020 | 6.8760 | 1.696800 | 55.4 |
| 6 | Spherical | 491.2720 | 0.2000 | | |
| 7 | Spherical | 21.3190 | 6.3000 | 1.487490 | 70.4 |
| 8 | Spherical | −62.4750 | 1.3000 | 1.805180 | 25.4 |
| 9 | Spherical | 18.6880 | 2.4710 | | |
| 10 | Spherical | −279.2930 | 1.4000 | 1.834000 | 37.3 |
| 11 | Aspheric | 41.9320 | 2.0000 | | |
| Aperture plane | Spherical | Infinite | 13.4250 | | |
| 13 | Spherical | 160.0960 | 1.3000 | 1.806100 | 33.2 |
| 14 | Spherical | 28.4050 | 9.5000 | 1.744000 | 44.9 |
| 15 | Spherical | −29.7850 | 10.4790 | | |
| 16 | Spherical | −99.1850 | 2.4000 | 1.805180 | 25.4 |
| 17 | Spherical | −48.6980 | 19.4530 | | |
| 18 | Aspheric | −15.9240 | 2.2000 | 1.531160 | 56.0 |
| 19 | Aspheric | −21.5000 | 2.8000 | | |
| 20 | Spherical | −20.3540 | 1.8000 | 1.696800 | 55.4 |
| 21 | Spherical | −125.9050 | 5.7043 | | |
| 22 | Spherical | −32.5666 | 3.0000 | 1.755201 | 27.5 |
| 23 | Spherical | −28.6251 | 2.7912 | | |
| 24 | Spherical | −25.4818 | 3.0000 | 1.666431 | 38.2 |
| 25 | Spherical | −38.8225 | 76.2682 | | |
| 26 | Aspheric (Reflection) | 218.7127 | −900.0000 | | |
| Image | Spherical | Infinite | 0.0000 | | |

In Example 1, although the projection lens 20 and the projection unit 3 basically have a spherical shape, an emission plane of the fifth lens L05, an incident/emission plane of the ninth lens L09 and the angle-widening mirror 33 have an aspheric shape. A displacement from a plane vertex of this aspheric shape in an optical axis OA direction is given by the above-described polynomial equation h. Values of the conic constant "k" and high order correction terms "$A_2$" to "$A_{10}$" of the aspheric planes constituting Example 1 are as shown in the following table 2.

TABLE 2

| Parameter | Value |
|---|---|
| 11th plane | |
| Y curvature radius | 41.9320 |
| Conic constant (K) | 0.7246 |
| 4-order coefficient (A) | 3.9881e−005 |
| 6-order coefficient (B) | 9.8654e−008 |
| 8-order coefficient (C) | −2.3440e−010 |
| 10-order coefficient (D) | 0.0000 |
| 18th plane | |
| Y curvature radius | −15.9240 |
| Conic constant (K) | −0.5143 |
| 4-order coefficient (A) | 1.1003e−005 |
| 6-order coefficient (B) | 8.1415e−008 |
| 8-order coefficient (C) | 1.1898e−012 |
| 10-order coefficient (D) | 7.3903e−015 |
| 19th plane | |
| Y curvature radius | −21.5000 |
| Conic constant (K) | 0.0000 |
| 4-order coefficient (A) | −2.0653e−006 |
| 6-order coefficient (B) | 4.5141e−008 |

TABLE 2-continued

| Parameter | Value |
| --- | --- |
| 8-order coefficient (C) | 0.0000 |
| 10-order coefficient (D) | 0.0000 |
| 26th plane | |
| Y curvature radius | 218.7127 |
| Conic constant (K) | −21.2361 |
| 4-order coefficient (A) | −2.9716e−008 |
| 6-order coefficient (B) | 2.1974e−012 |
| 8-order coefficient (C) | −1.5114e−016 |
| 10-order coefficient (D) | 6.6047e−021 |

FIG. 14B shows a state of projection onto the screen SC when the projection unit 3 is connected to the body 2. As is apparent from the figure, an ultra-short projection is made with an image satisfactorily formed on the screen SC.

Figure 15A:
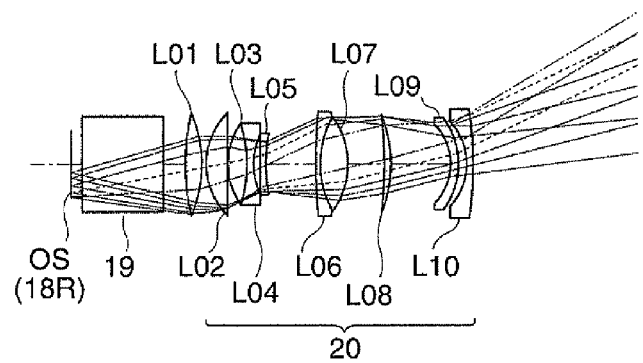
FIG. 15A shows a state where a projection unit is detached from the body and FIG. 15B is a view illustrating a middle and long distance projection under a state where the projection unit is detached from the body.
Figure 15B:
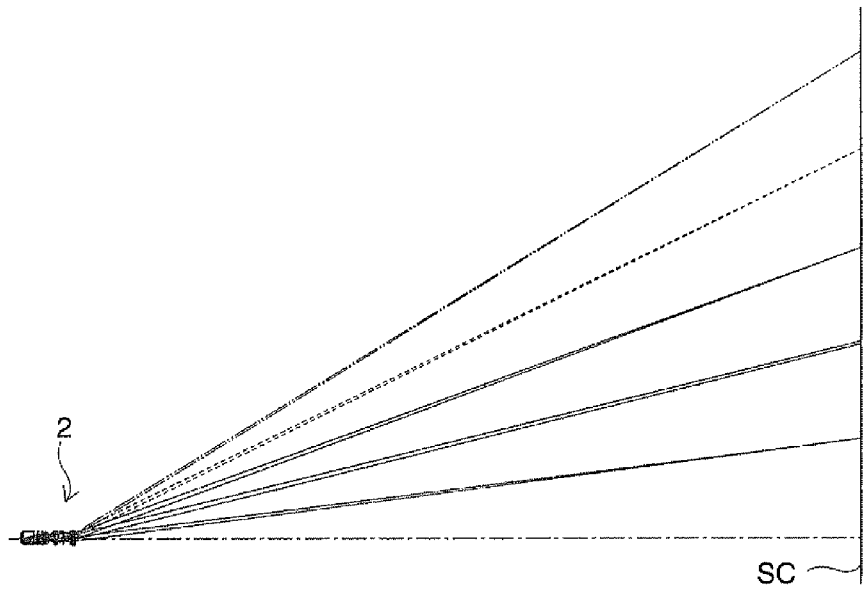

FIGS. 15A and 15B show a state when the projection lens 20 enters the first mode as the projection unit 3 is disconnected from the body 2. In this case, in comparison with the state shown in FIG. 14A, the first lens L01 to the tenth lens L10 are collectively moved to the object side to enter the normal display state.

FIG. 15B shows a state of projection onto the screen SC when the projection unit 3 is disconnected from the body 2. In this case, the projection lens 20 goes into the normal display state. As is apparent from the figure, the projection lens 20 alone makes an ultra-short projection with an image satisfactorily formed on the screen SC.

Figure 16A:
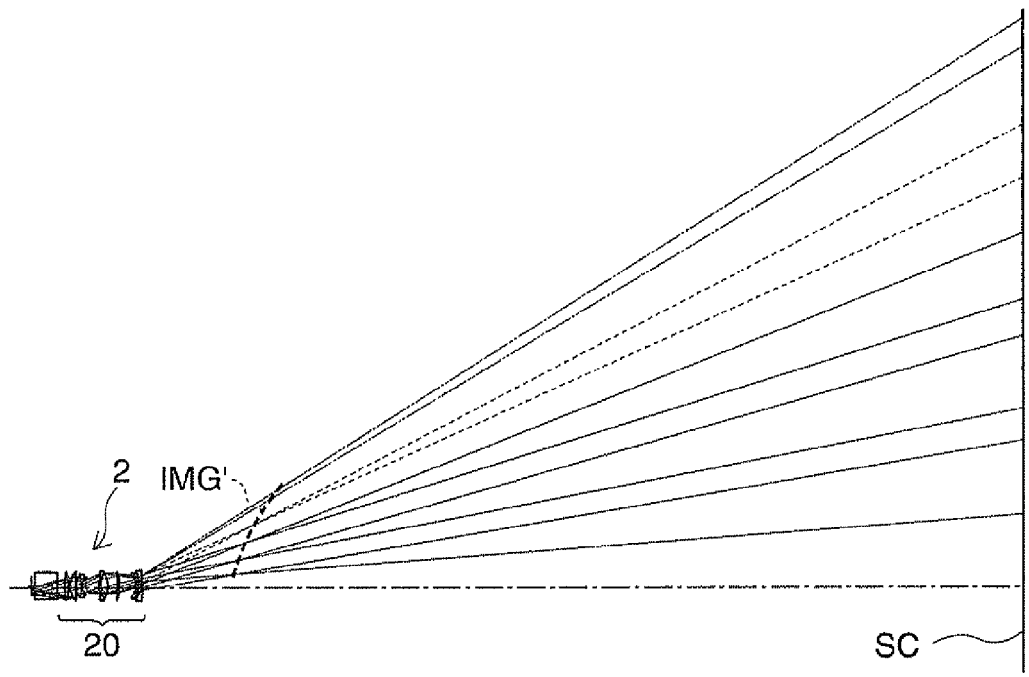
FIGS. 16A and 16B are a view showing a state where a projection unit is detached from the system of FIG. 14B and an enlarged view thereof, respectively.

FIG. 16A shows a case where the projection unit 3 is removed from the state of FIG. 14B and the projection lens 20 is in the macro display state. It can be seen from this figure that the image plane IMG' is formed at a position close to the projection lens 20 without the image plane IMG' formed on the front screen SC.

Figure 16B:
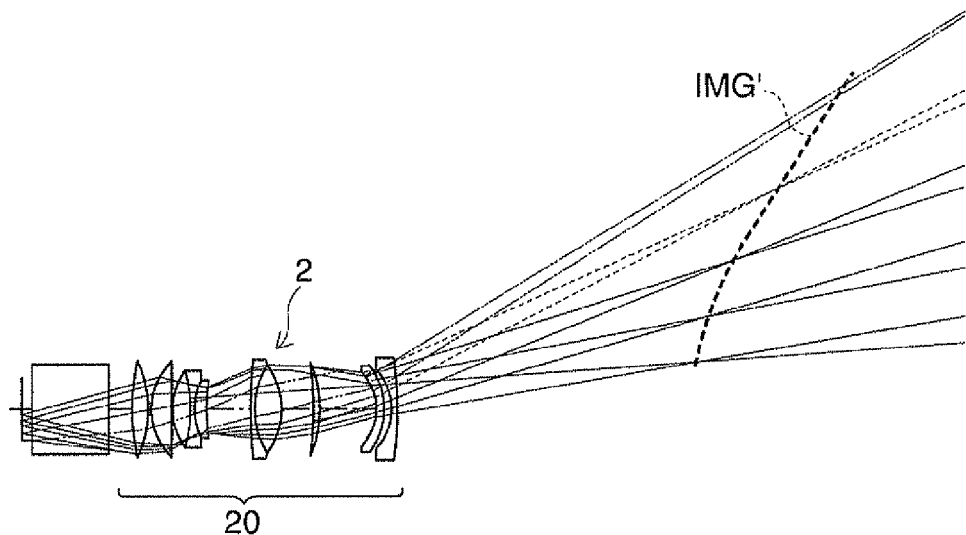

FIG. 16B is an enlarged view of a portion of FIG. 16A. It can be seen from this figure that an inclined image plane IMG' is formed at a position close to the projection lens 20, assuming that there is no projection unit 3.

Second Embodiment

Figure 17:
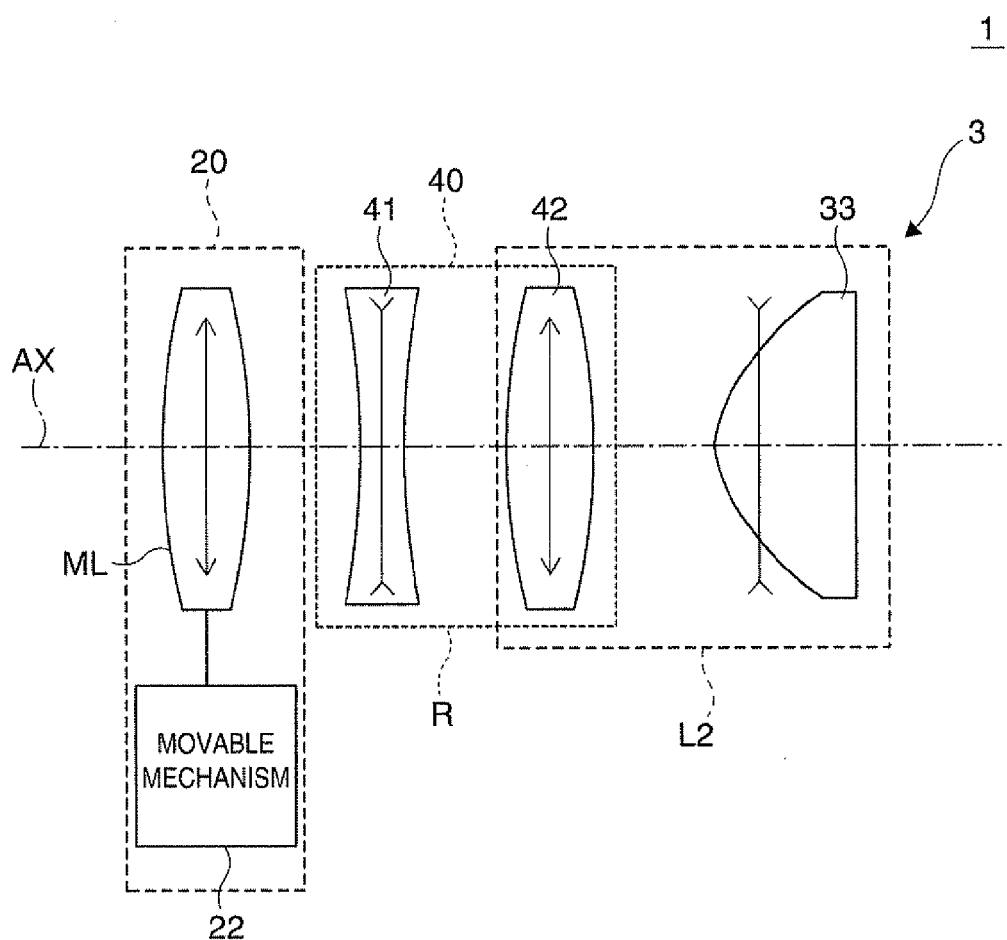
FIG. 17 is a schematic view showing various optical elements of a projector according to a second embodiment of the invention.

FIG. 17 is a schematic view illustrating functions of various optical elements of a projector according to a second embodiment of the invention. This embodiment is characterized by including a reduction optical system R instead of the enlargement optical system W of the first embodiment. The same elements as in the first embodiment are denoted by the same reference numerals and description thereof will not be repeated. A projection unit 3 includes, as optical elements, a first lens 41, a second lens 42 and an angle-widening mirror 33. A projection lens (projection optical system) 20, the first lens 41, the second lens 42 and the angle-widening mirror 33 are arranged with their optical axes coincided with one another.

The first lens 41 is a negative power optical element and a concave lens having a spherical or aspheric surface. The second lens 42 is a positive power optical element provided at a projection side of the first lens 41 and a convex lens having a spherical or aspheric surface. This embodiment employs the configuration that, after obtaining an inclined image plane using a master lens ML which is the projection lens 20, the image thereof is reduced by the reduction optical system R of the projection unit 3. The reduction optical system R is constituted by a refraction optical system 40 including the first lens 41 and the second lens 42. The reduction optical system R acts as a variable magnification optical system to vary a magnification of an image forming an image plane inclined to the normal line N of the optical axis AX.

Figure 18A:
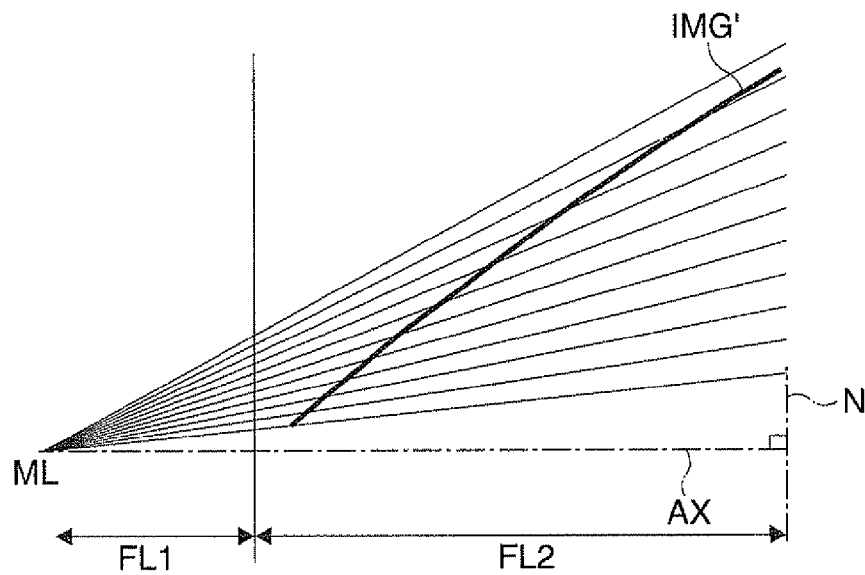
FIG. 18A is a view illustrating an optical property of a master lens according to the second embodiment and FIG. 18B is a view showing an example of simulation of an inclined image plane for an ultra-short projection.

FIG. 18A is a view illustrating an optical property of the master lens ML in this embodiment. The image plane by the master lens ML is erected or inverted substantially perpendicular to the optical axis AX (substantially parallel to the display plane DS) in an image formation range which is closer to a predetermined distance and is inclined to the normal line N in a range which is farther from the predetermined distance. The master lens ML makes a middle and long distance projection using a first range FL1 where the image plane is erected or inverted parallel to the display plane DS. In addition, as indicated by a thick line in the figure, the master lens ML makes an image plane IMG' inclined to the normal line N for an extremely short ultra-short projection in a second range FL2 which is farther than the first range FL1 when viewed from the master lens ML.

Figure 18B:
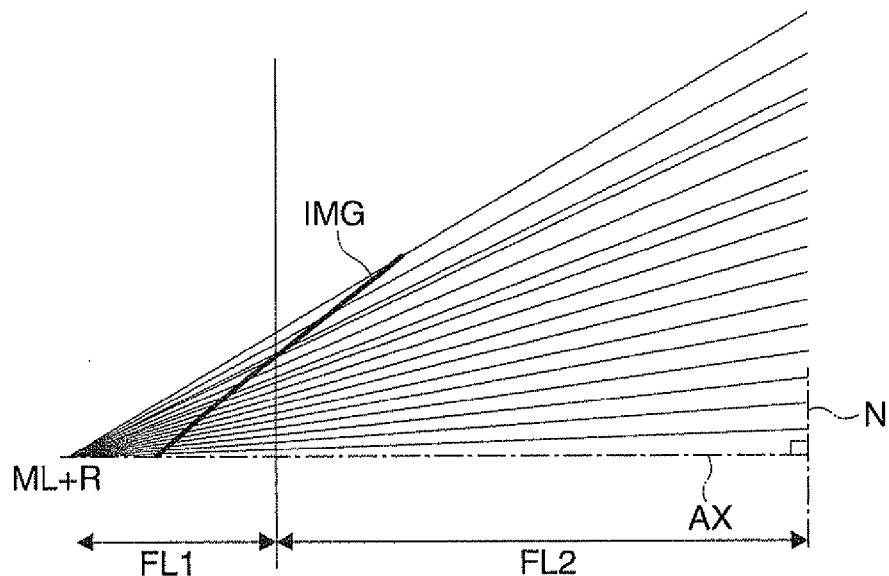

FIG. 18B is a view showing an example of simulation of an inclined image plane IMG for an ultra-short projection. The image plane IMG' by the master lens ML is reduced to the shown image plane IMG by the reduction optical system R. Image light obtained by reducing an image of the inclined image plane IMG' by the reduction optical system R is reflected by an aspheric mirror AM, and accordingly, the image is formed on an approximated screen with the image erected or inverted parallel to the display plane DS.

In this manner, in the first mode where the projection lens (projection optical system) 20 is used alone, the projection lens 20 makes a middle and long distance projection with the image plane erected or inverted on the display plane DS in the first range FL1. In addition, in the second mode where the projection lens 20 is combined with the projection unit 3, the projection lens 20 forms the image plane IMG' (see FIG. 18A) inclined to the normal line N of the optical axis AX by means of the movable mechanism 22 or the like. The projection unit 3 constituted by the first lens 41, the second lens 42 and the angle-widening mirror 33 acts as a front converter as a whole to enlarge an image. Among these, the first lens 41 and the second lens 42 constitute the reduction optical system R which reduces the inclined image plane IMG' by the master lens ML between the master lens ML and the angle-widening mirror 33. As image light corresponding to the inclined and appropriately reduced image plane IMG' is reflected by the aspheric mirror AM, an image is formed on the approximated screen SC (see FIG. 13) placed substantially perpendicular to the optical axis AX with the image erected or inverted substantially parallel to the display plane DS, as in the first embodiment. Also in this embodiment, it is possible to realize both of the extremely short distance ultra-short projection and the middle and long distance projection using a single projector 1 without deteriorating image quality.

Third Embodiment

Figure 19:
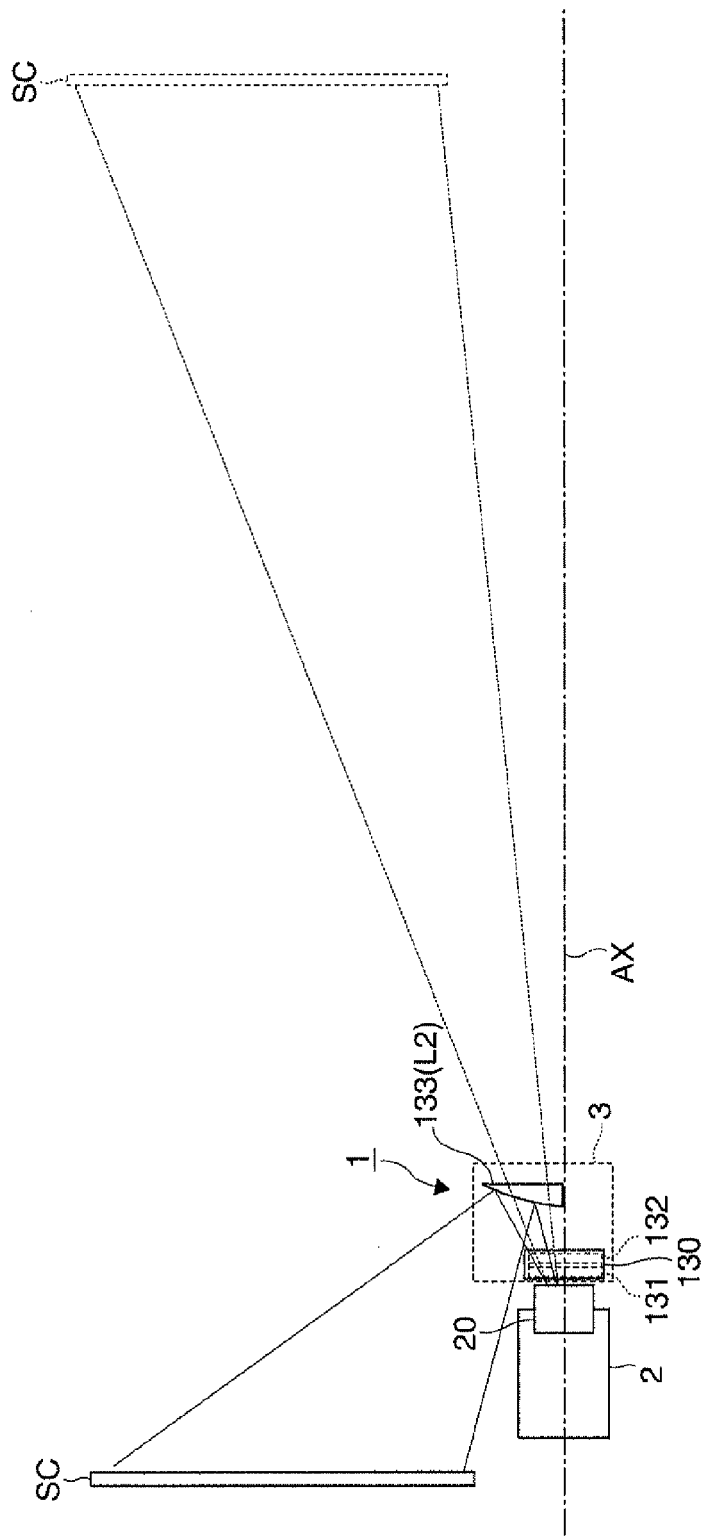
FIG. 19 is a view illustrating an outline of a projector according to a third embodiment of the invention.

FIG. 19 is a view illustrating a projector according to a third embodiment of the invention. A projector 1 of this embodiment is a modification of the projector 1 of the first embodiment, where the same elements are denoted by the same reference numerals and description thereof is not repeated.

In the projector 1 of this embodiment, the body 2 alone allows a middle and long distance projection on a front screen SC. The projection unit 3 allows a short distance projection on a rear screen SC by being connected with the body 2.

The projection unit 3 includes, as optical elements, a refraction optical system 130 and an angle-widening mirror 133, and these optical elements 130 and 133 are integrally supported on a board (not shown) with their optical axes coincided with each other. The refraction optical system 130 includes, for example, a first lens 131 and a second lens 132.

Figure 20:
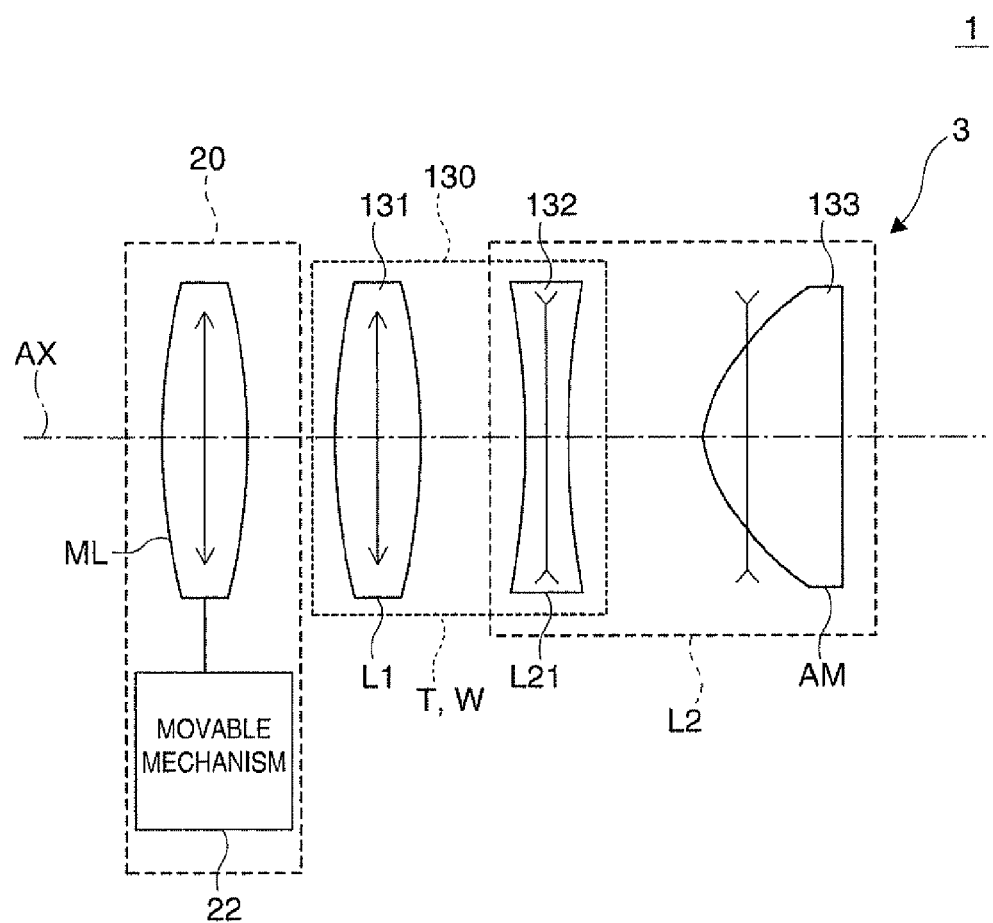
FIG. 20 is a schematic view showing various optical elements of the projector according to the third embodiment.

FIG. 20 is a schematic view where various optical elements constituting a projection optical system of the projector 1 are classified in terms of function for the sake of convenience of description. The projection lens (projection optical system) 20 corresponds to the master lens ML of FIG. 5 and alone allows the middle and long distance projection as shown in FIG. 19. The projection unit 3 is a combination of a positive power optical element L1 and a negative power optical element L2 of FIG. 5. Of these, the optical element L1 corresponds to the first lens 131 of an object side in the refraction optical system 130 constituting the projection unit 3 and the optical element L2 is a combination of the second lens 132 of an image side in the refraction optical system 130 and the angle-widening mirror 133.

Like the aspheric mirror AM of FIG. 5, the angle-widening mirror 133 acts to erect or invert an image plane IMG perpendicular to the optical axis AX (parallel to the display plane DS) and reduce image plane curve on the screen SC.

In this embodiment, as the projection lens 20 is moved, the projection lens 20 can be switched between the first mode (middle and long distance projection, normal display state) and the second mode (ultra-short projection, macro display state). That is, by moving the projection lens 20 to, for example, an image side along the optical axis AX, the projection lens 20 can be switched to the second mode to form the image plane at a relatively close position. In addition, by inclining the image plane at the relatively close position by means of the positive power first lens 131 and the negative power second lens 132 and simultaneously enlarging the image and making the image parallel to the display plane DS by means of the angle-widening mirror 133, it is possible to achieve a projection onto the approximated screen SC. That is, the refraction optical system 130 has both of a function of an image inclination optical system T, which is an image plane control optical system, and a function of an enlargement optical system W, which is a variable magnification optical system. As a result, the projection lens 20 of this embodiment does not have the function of the image plane control optical system by itself, unlike the first embodiment.

According to this embodiment, it is possible to realize both of the extremely short distance ultra-short projection and the middle and long distance projection using a single projector 1 without deteriorating image quality. The single projector 1 can cover a wide projection range from an extremely short distance to a middle and long distance.

Example 2

Figure 21A:
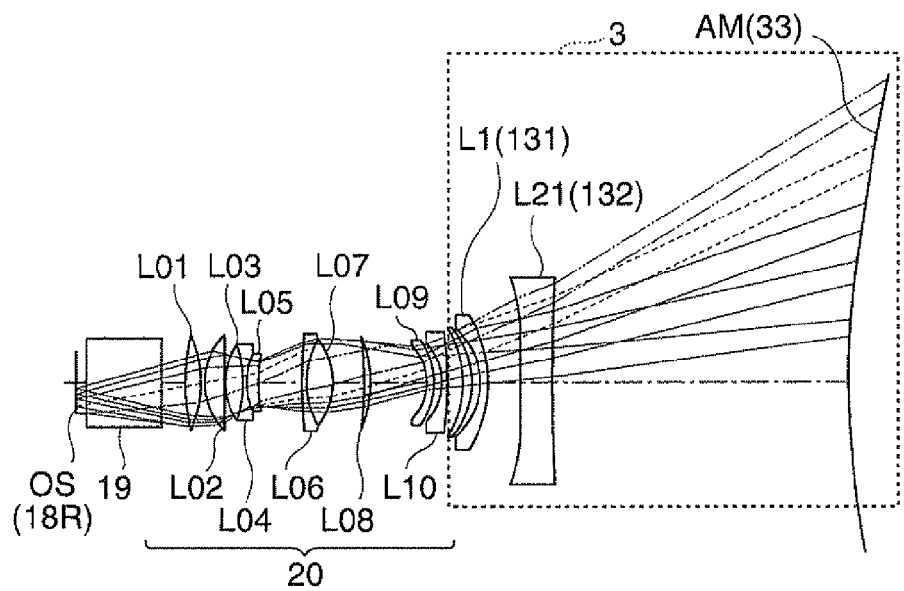
FIG. 21A is a view illustrating an optical system in an example of the third embodiment and FIG. 21B is a view illustrating an ultra-short projection by the optical system in the example.
Figure 21B:
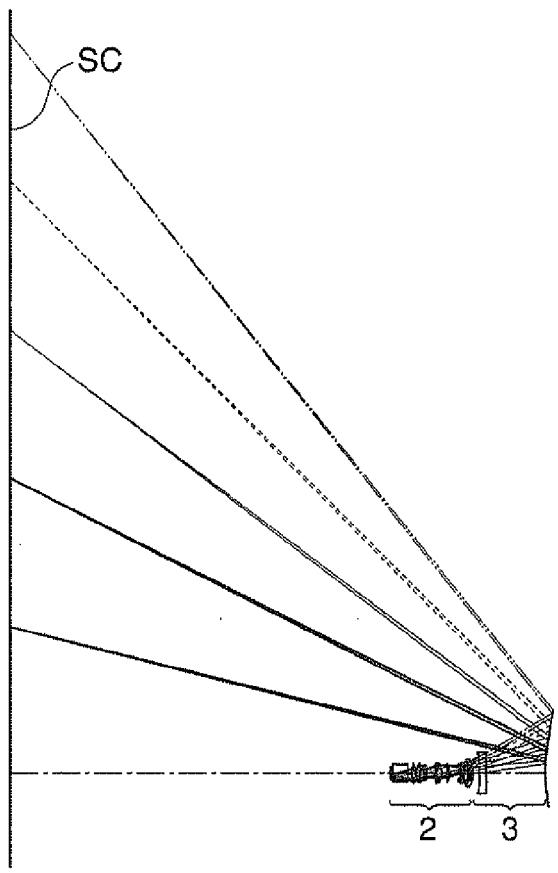

FIGS. 21A and 21B are views illustrating Example 2 of an ultra-short projection by a combination of the projection lens 20 and the projection unit 3 in the second mode. In this example, the projection lens 20 includes lenses L01 to L10. The projection unit 3 includes the first and second lenses 131 and 132 and the angle-widening mirror 33.

The following table 3 shows lens data and the like of Example 2. In this table 3, "plane number," "plane type," "R," "D," "Nd" and "vd" represents the same meaning as Example

TABLE 3

| Plane No | Plane Type | R | D | Nd | vd |
|---|---|---|---|---|---|
| Object | Spherical | Infinite | 3.3057 | | |
| 1 | Spherical | Infinite | 25.7500 | 1.516800 | 64.2 |
| 2 | Spherical | Infinite | 7.0023 | | |

TABLE 3-continued

| Plane No | Plane Type | R | D | Nd | vd |
|---|---|---|---|---|---|
| 3 | Spherical | 153.5530 | 5.4000 | 1.589130 | 61.1 |
| 4 | Spherical | −37.9820 | 1.0000 | | |
| 5 | Spherical | 23.1020 | 6.8760 | 1.696800 | 55.4 |
| 6 | Spherical | 491.2720 | 0.2000 | | |
| 7 | Spherical | 21.3190 | 6.3000 | 1.487490 | 70.4 |
| 8 | Spherical | −62.4750 | 1.3000 | 1.805180 | 25.4 |
| 9 | Spherical | 18.6800 | 2.4710 | | |
| 10 | Spherical | −279.2930 | 1.4000 | 1.834000 | 37.3 |
| 11 | Aspheric | 41.9320 | 2.0000 | | |
| Aperture plane | Spherical | Infinite | 13.4250 | | |
| 13 | Spherical | 160.0960 | 1.3000 | 1.806100 | 33.2 |
| 14 | Spherical | 28.4050 | 9.5000 | 1.744000 | 44.9 |
| 15 | Spherical | −29.7850 | 10.4790 | | |
| 16 | Spherical | −99.1850 | 2.4000 | 1.805180 | 25.4 |
| 17 | Spherical | −48.6980 | 19.4530 | | |
| 18 | Aspheric | −15.9240 | 2.2000 | 1.531160 | 56.0 |
| 19 | Aspheric | −21.5000 | 2.8000 | | |
| 20 | Spherical | −20.3540 | 1.8000 | 1.696800 | 55.4 |
| 21 | Spherical | −125.9050 | 4.6697 | | |
| 22 | Spherical | −41.2901 | 9.3599 | 1.743972 | 44.8 |
| 23 | Spherical | −40.3699 | 9.7444 | | |
| 24 | Aspheric | 2581.8400 | 11.0000 | 1.530000 | 55.8 |
| 25 | Aspheric | 230.9616 | 100.0000 | | |
| 26 | Aspheric (Reflection) | 241.4350 | −900.0000 | | |
| Image | Spherical | Infinite | 0.0000 | | |

In Example 2, although the projection lens 20 and the projection unit 3 basically have a spherical shape, an emission plane of the fifth lens L05, an incident/emission plane of the ninth lens L09 and the angle-widening mirror 33 have an aspheric shape. A displacement from a plane vertex of this aspheric shape in an optical axis OA direction is given by the above-described polynomial equation h. Values of the conic constant "k" and high order correction terms "$A_2$" to "$A_{10}$" of the aspheric planes constituting Example 2 are as shown in the following table 4.

TABLE 4

| Parameter | Value |
|---|---|
| 11th plane | |
| Y curvature radius | 41.9320 |
| Conic constant (K) | 0.7246 |
| 4-order coefficient (A) | 3.9881e−005 |
| 6-order coefficient (B) | 9.8654e−008 |
| 8-order coefficient (C) | −2.3440e−010 |
| 10-order coefficient (D) | −0.0000 |
| 18th plane | |
| Y curvature radius | −15.9240 |
| Conic constant (K) | −0.5143 |
| 4-order coefficient (A) | 1.1003e−005 |
| 6-order coefficient (B) | 8.1415e−008 |
| 8-order coefficient (C) | 1.1898e−012 |
| 10-order coefficient (D) | 7.3903e−015 |
| 19th plane | |
| Y curvature radius | −21.5000 |
| Conic constant (K) | 0.0000 |
| 4-order coefficient (A) | −2.0653e−006 |
| 6-order coefficient (B) | 4.5141e−008 |
| 8-order coefficient (C) | 0.0000 |
| 10-order coefficient (D) | 0.0000 |
| 24th plane | |
| Y curvature radius | 2581.8400 |
| Conic constant (K) | 0.0000 |
| 4-order coefficient (A) | −8.0411e−007 |
| 6-order coefficient (B) | −5.0216e−010 |

TABLE 4-continued

| Parameter | Value |
| --- | --- |
| 8-order coefficient (C) | −5.4226e−013 |
| 10-order coefficient (D) | 2.6770e−017 |
| 25th plane | |
| Y curvature radius | 230.9616 |
| Conic constant (K) | 0.0000 |
| 4-order coefficient (A) | −2.1298e−007 |
| 6-order coefficient (B) | −4.7812e−010 |
| 8-order coefficient (C) | −1.3046e−013 |
| 10-order coefficient (D) | 5.6445e−017 |
| 26th plane | |
| Y curvature radius | 241.4350 |
| Conic constant (K) | −16.6510 |
| 4-order coefficient (A) | −1.9759e−008 |
| 6-order coefficient (B) | 8.6840e−013 |
| 8-order coefficient (C) | −2.7513e−017 |
| 10-order coefficient (D) | 8.0184e−022 |

FIG. 21B shows a state of projection onto the screen SC when the projection unit 3 is connected to the body 2. As is apparent from the figure, an ultra-short projection is made with an image satisfactorily formed on the screen SC.

Figure 22A:
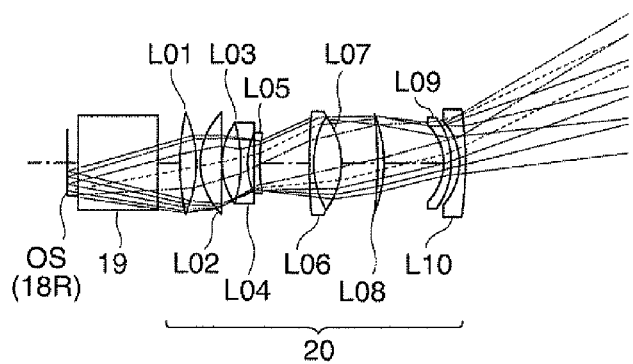
FIG. 22A shows a state where a projection unit is detached from the body and FIG. 22B is a view illustrating a middle and long distance projection under a state where the projection unit is detached from the body.
Figure 22B:
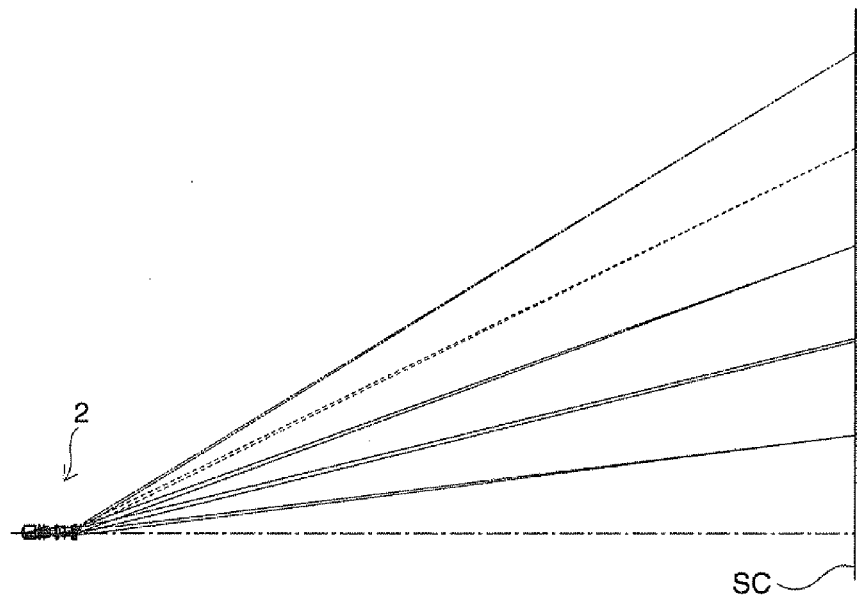

FIGS. 22A and 22B show a state when the projection lens 20 enters the first mode as the projection unit 3 is disconnected from the body 2. In this case, in comparison with the state shown in FIG. 21A, the first lens L01 to the tenth lens L10 and the like are collectively moved to the object side to enter the normal display state.

FIG. 22B shows a state of projection onto the screen SC when the projection unit 3 is disconnected from the body 2. In this case, the projection lens 20 goes into the normal display state. Although not described in detail, the projection lens 20 alone makes an ultra-short projection with an image satisfactorily formed on the screen SC.

Figure 23A:
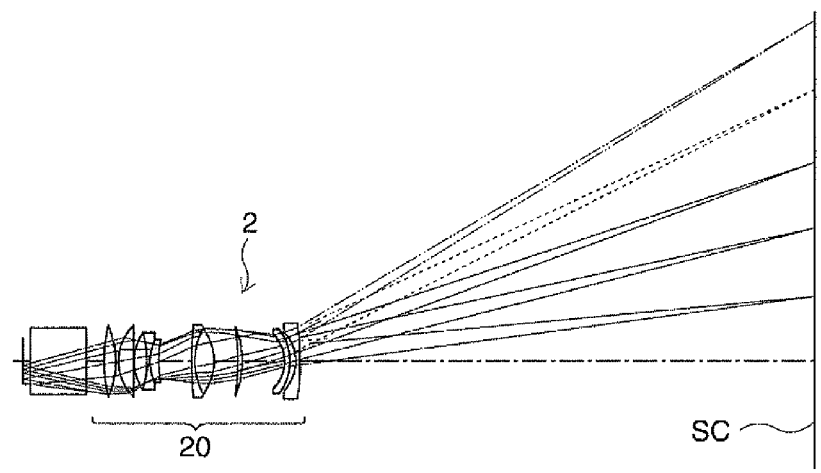
FIG. 23A is an enlarged view showing a state where the projection unit is detached from the system of FIG. 21B and a view showing a light flux state and FIG. 23B shows a state where an angle-widening mirror is detached.

FIG. 23A shows a case where the projection unit 3 is removed from the state of FIG. 21A and the projection lens 20 is in the macro display state. It can be seen from this figure that the image parallel to the display plane DS is formed on the screen SC placed close to the projection lens 20 without the image formed on the front screen SC placed distant to the projection lens 20.

Figure 23B:
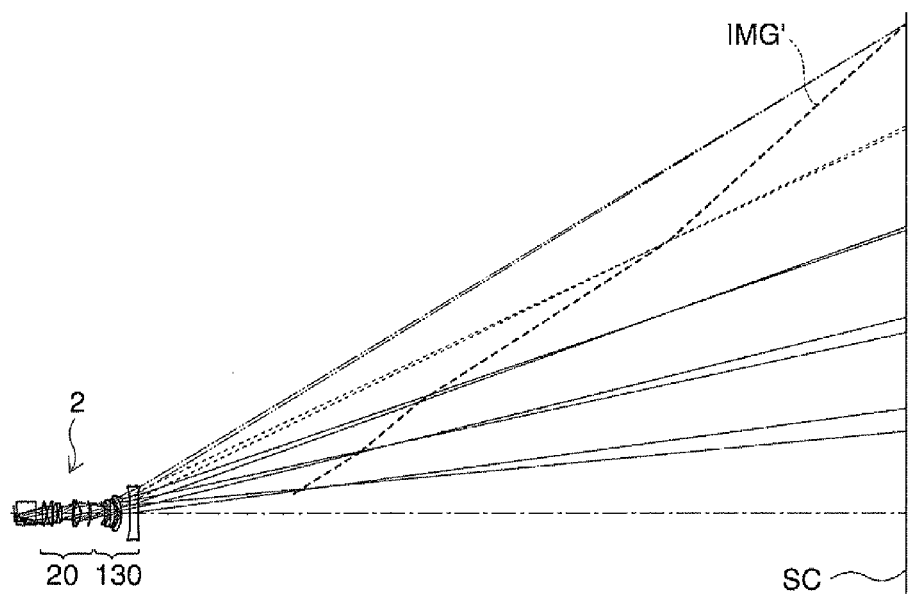

FIG. 23B is a view showing an image formation state where the projection lens 20 is in the macro display state and only the angle-widening mirror 33 is detached with the refraction optical system 130 of the projection unit 3 left. It can be seen from this figure that a greatly inclined image plane IMG' is formed at a position far from the projection lens 20, assuming that there is no angle-widening mirror 33.

Fourth Embodiment

Figure 24:
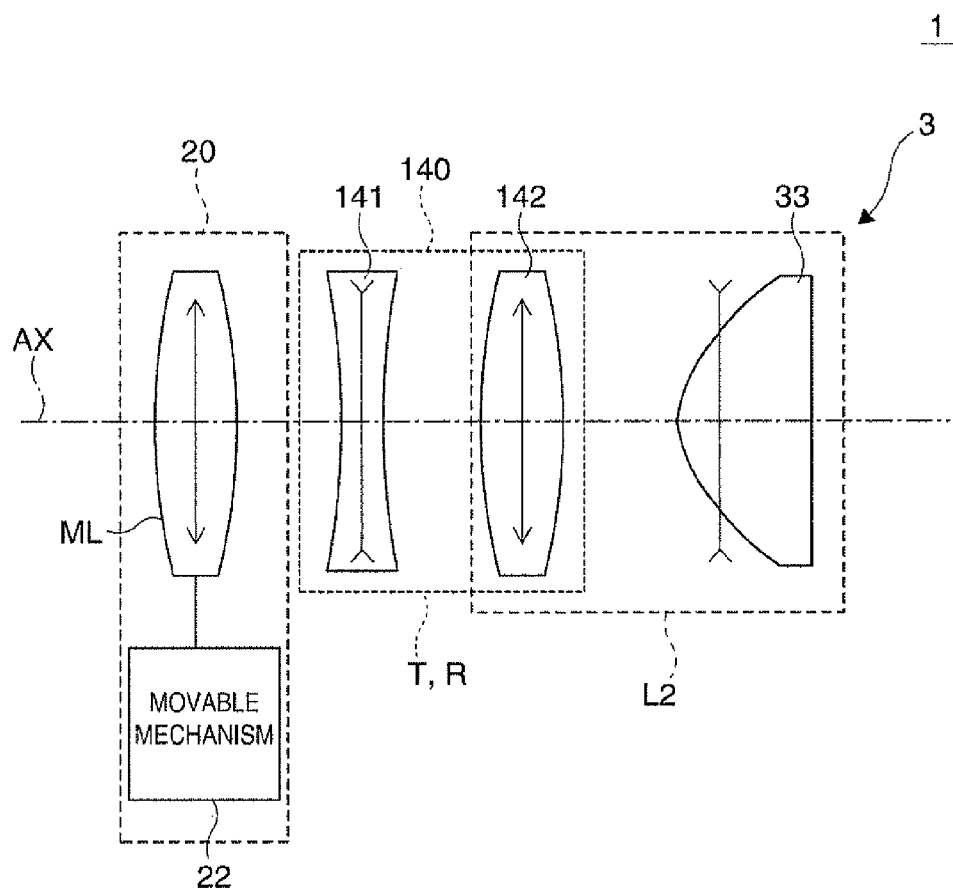
FIG. 24 is a schematic view showing various optical elements of a projector according to a fourth embodiment.

FIG. 24 is a schematic view where various optical elements of a projector according to a fourth embodiment of the invention are classified in terms of function for the sake of convenience of description. This embodiment is a modification of the projector 1 of the third embodiment or the second embodiment, where the same elements are denoted by the same reference numerals and description thereof will not be repeated.

A projection lens (projection optical system) 20 corresponds to the master lens ML of FIG. 20 or 17 and alone allows a middle and long distance projection. A projection unit 3 includes, as optical elements, a first lens 141, a second lens 142 and an angle-widening mirror 33.

In the projection unit 3, the first lens 141 is a negative power optical element and a concave lens having a spherical or aspheric surface. The second lens 142 is a positive power optical element provided at a projection side of the first lens 141 and a convex lens having a spherical or aspheric surface.

In this embodiment, as the projection lens 20 is moved, etc. the projection lens 20 forms the image plane parallel to the display plane DS at a relatively far position. In addition, by inclining the image plane at the relatively far position by means of the negative power first lens 141 and the positive power second lens 142 and simultaneously reducing the image, it is possible to achieve a projection onto the approximated screen SC. That is, the refraction optical system 140 has both of a function of an image inclination optical system T, which is an image plane control optical system, and a function of a reduction optical system R, which is a variable magnification optical system. As a result, the projection lens 20 of this embodiment does not have the function of the image plane control optical system or the image plane inclination optical system by itself, unlike the second embodiment. In addition, the refraction optical system 140 of this embodiment has the function of the reduction optical system R other than the enlargement optical system W, unlike the third embodiment.

According to this embodiment, it is possible to realize both of the extremely short distance ultra-short projection and the middle and long distance projection using a single projector 1 without deteriorating image quality. The single projector 1 can cover a wide projection range from an extremely short distance to a middle and long distance.

The features described in the first to fourth embodiments of the invention may be applied to a rear projection type projector. For example, by integrating a rear projection type screen and the projection unit 3 and setting the body 2 to be attached/detached, it is possible to realize a combined function of a rear projector and a front projection type projector.

Fifth Embodiment

Figure 25:
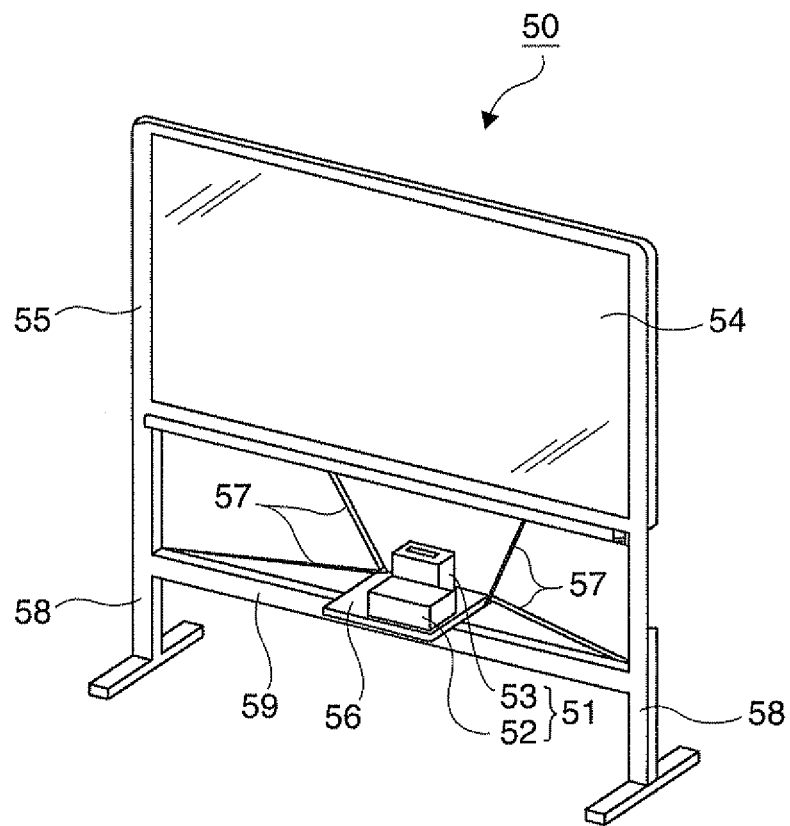
FIG. 25 is a front perspective view of an interactive board according to a fifth embodiment of the invention.

FIG. 25 is a front perspective view of an interactive board 50 according to a fifth embodiment of the invention. The interactive board 50 includes a projector 51 having the same configuration as the projector 1 (see FIG. 1 and the like) according to the first to fourth embodiments. The projector 51 includes a body 52 and a projection unit 53.

The body 52 emits image light based on an image signal. The projection unit 53 projects the image light from the body 52 toward a screen display unit 54. The body 52 and the projection unit 53 have the same configuration as the body 2 (see FIG. 2 and the like) and the projection unit 3 (see FIG. 4 and the like) described in the first to fourth embodiments, respectively. Optical elements of the projection unit 53 are accommodated in a housing. The housing includes an opening through which the image light emitted.

The screen display unit 54 can display a picture according to the image light incident from the projector 51 and write an image into a display plane. The screen display unit 54 is made of transflective glass or synthetic resin to transmit light. A user writes characters or figures on the screen display unit 54 using a writing tool, for example, a pen or a pointer. In addition, the user erases the writing on the screen display unit 54 using an erasing tool or the like.

The interactive board 50 includes a reading device (not shown). The reading device reads contents written on the display plane of the screen display unit 54, an image displayed on the screen display unit 54, information input by contacting or approaching a tool to the screen display unit 54, and the like. An example of the reading device may include an image sensor of a CCD camera or the like. The interactive board 50 can record contents written on the screen display unit 54, an image displayed at that time, input information, and the like by providing such a reading device.

The screen display unit 54 is mounted on a frame-like rest 55. A plate-like projector mount 55 to fasten the projector 51 is placed on a prism 59 connecting two legs 58 of the rest 55. The projector 51 is mounted on the projector mount 56 perpendicularly below to the screen display unit 54. Four rod-like members 57 extending radially to connect the projector mount 56 and the rest 55 act as reinforcing members to reinforce mounting between the projector mount 56 and the rest 55.

Figure 26:
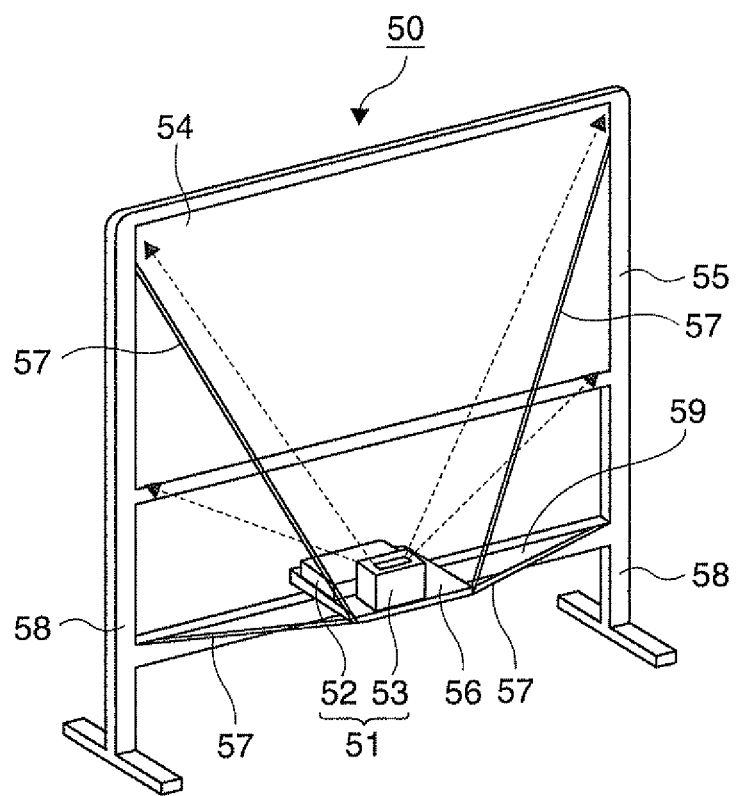
FIG. 26 is a rear perspective view of the interactive board.

FIG. 26 is a rear perspective view of the interactive board 50. The projector 51 makes an ultra-short projection of image light at the rear side which is opposite to the front side of the screen display unit 54 at which an image is observed. The screen display unit 54 transmits the image light incident from the projector 51 into the rear side to the front side. The screen display unit 54 includes optical diffusibility to diffuse the image light incident from the projector 51. The screen display unit 54 superimposes and displays characters or figures written on the front side on an image displayed by image light incident from the rear side. An observer observes the written characters or figures and the image light diffused on the screen display unit 54.

An end portion of each rod-like member 57 at a projector mount 56 side is bonded in the rear side of the projection unit 53. End portions of the two rod-like members 57 at a rest 55 side are respectively bonded near the left and right tops of the screen display unit 54 in the rest 55. End portions of the remaining two rod-like members 57 are bonded at portions where end portions at the rest 55 side are connected to the prism 59 and the legs 58. Dashed line arrows in the figure represent light rays traveling from the projection unit 53 to four corners of the screen display unit 54. The rod-like members 57 are arranged around a region where the image light travels between the projector 51 and the screen display unit 54.

When the rod-like members 57 are arranged around the region where the image light travels, they do not block the image light while reinforcing mounting of the projector mount 56. In addition, the rod-like members 57 acts as a defensive structure to prevent the image light from being blocked due to a portion present around the interactive board 50.

Figure 27A:
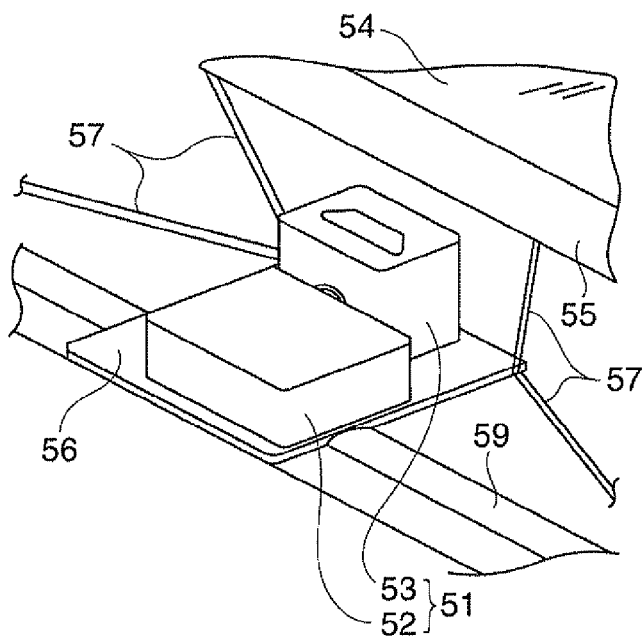
FIG. 27A is a view showing a projector mount and its peripherals and FIG. 27B is a view showing a state where a body is removed from the state shown in FIG. 27A.

FIG. 27A is a view showing the projector mount 56 and its peripherals of the interactive board 50 under a state where the projector 51 is installed. In the interactive board 50, by fixing the projector 51 to the rest 55 by means of the projector mount 56, it is possible to hold the projector 51 while being aligned with the screen display unit 54 with high precision. This allows a high quality image to be displayed on the screen display unit 54. The projection unit 53 of the projector 51 is mounted on the projector mount 56, and the body 52 of the projector 51 can be disconnected from the projection unit 53 and may be independently detached from the projector mount 56.

Figure 27B:
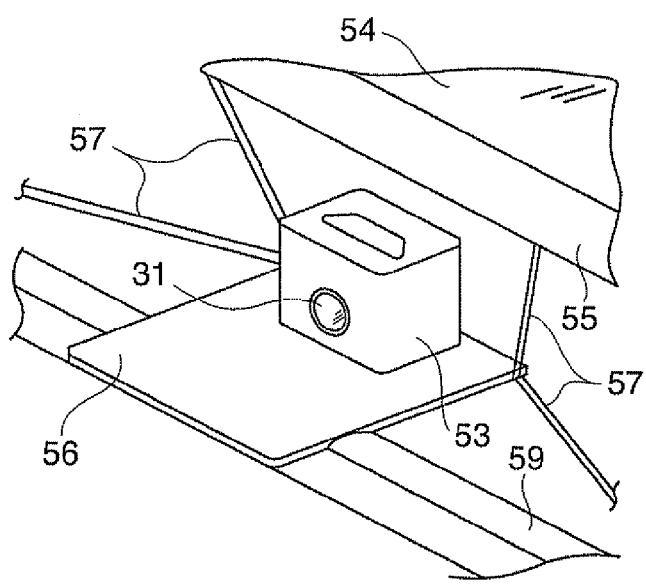

FIG. 27B is a view showing a state where the body 52 is removed from the state shown in FIG. 27A. The body 52 can be appropriately attached to and detached from the projector mount 56 for independent use. This allows use as the interactive board 50 by the attachment of the body 52 to the projector mount 56 (ultra-short projection) and a middle and long distance projection by the detachment of the body 52 from the interactive board 50. By arranging the projector 51 perpendicularly below to the screen display unit 54, the body 52 is placed at a low position of the interactive board 50. This facilitates attachment of the body 52 to the interactive board 50.

Figure 28:
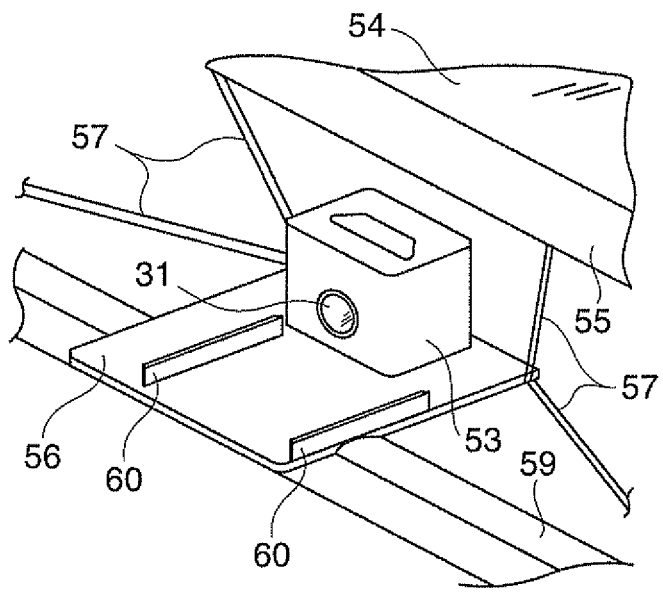
FIG. 28 is a view showing a projector fixing unit including a guide structure.

In addition, as shown in FIG. 28, the projector mount 56 may include a guide structure 60 to position the body 52. An example of the guide structure 60 may include a plate-like member formed along a side of the body 52. The body 52 is slid on the projector mount 56 along the guide structure 60 and is positioned by contacting with a casing of the projection unit 53. This allows the body 52 to be easily installed at a precise position whenever the body 52 is mounted on the interactive board 50. In addition, the guide structure 60 is not limited thereto but any structure may be adopted as long as it can position the body 52 with respect to the projection unit 53 and the like in the interactive board 50.

Figure 29:
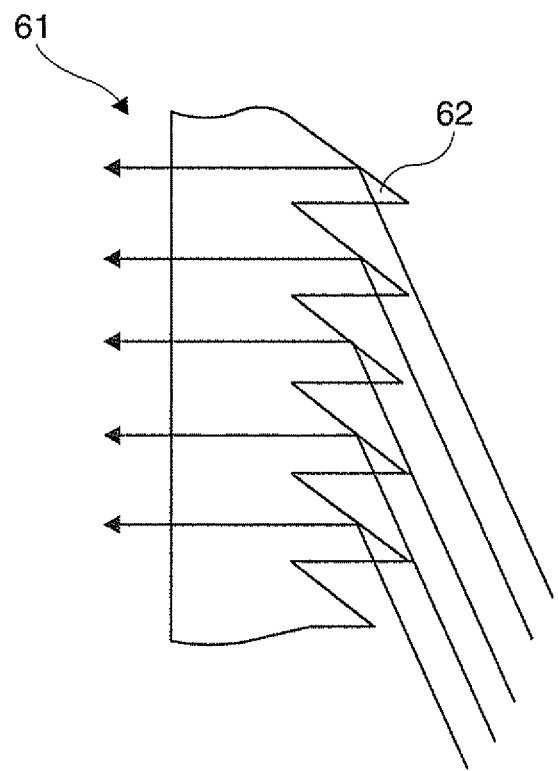
FIG. 29 is a schematic sectional view of a Fresnel lens formed in a screen display unit.

FIG. 29 is a schematic sectional view of a Fresnel lens 61 formed in the screen display unit 54. The Fresnel lens 61 is formed in the rear of a side of the screen display unit 54 where image light is incident from the projector 51. The Fresnel lens 61 acts as an angle converter to convert an angle of the image light.

The Fresnel lens 61 includes a plurality of prism structures 62 each having an about triangular shape. The prism structures 62 are about concentrically arranged around the optical axis AX (see FIG. 4 and the like). By converting an angle of the image light traveling inclined to the screen display unit 54, the Fresnel lens 61 can travel the image light to an observer with high efficiency. This allows a bright image with uniform brightness to be displayed on the screen display unit 54 of the interactive board 50.

The interactive board 50 suppresses a size in a depth direction by employing the projector 51 for an extremely short distance ultra-short projection. In addition, high generality and convenience can be secured by allowing a middle and long distance projection by the body 52 alone. The interactive board 50 can achieve reduced weight, power consumption and costs by application of the projector 51 for an enlargement projection to secure a sufficient size by proximity. Accordingly, it is possible to provide an interactive board capable of reducing weight, power consumption and costs and suppressing a depth size with increased convenience.

Figure 30:
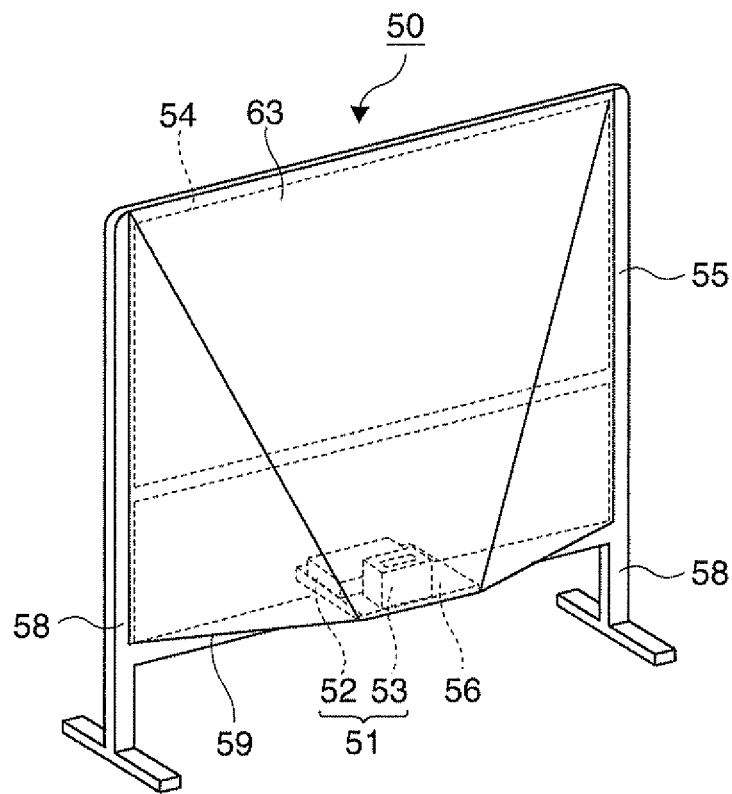
FIG. 30 is a rear perspective view of an interactive board provided with a cover instead of a rod-like member.

FIG. 30 is a rear perspective view of the interactive board 50 provided with a cover 63 instead of the rod-like members 57. The cover 63 is configured by a combination of light shielding plate-like members. The cover 63 covers a region where image light travels. The cover 63 prevents external light from introducing into an optical path from the projector 51 to the screen display unit 54.

As the cover 63 reduces the introduction of the external light, the interactive board 50 can display an image with a high contrast on the screen display unit 54. In addition, the cover 63 acts as a reinforcing member to reinforce mounting of the projector mount 56. The cover 63 does not block the image light while reinforcing mounting of the projector mount 56. In addition, the cover 63 performs a defensive function to prevent alien substances from introducing into a region where the image light travels.

Figure 31:
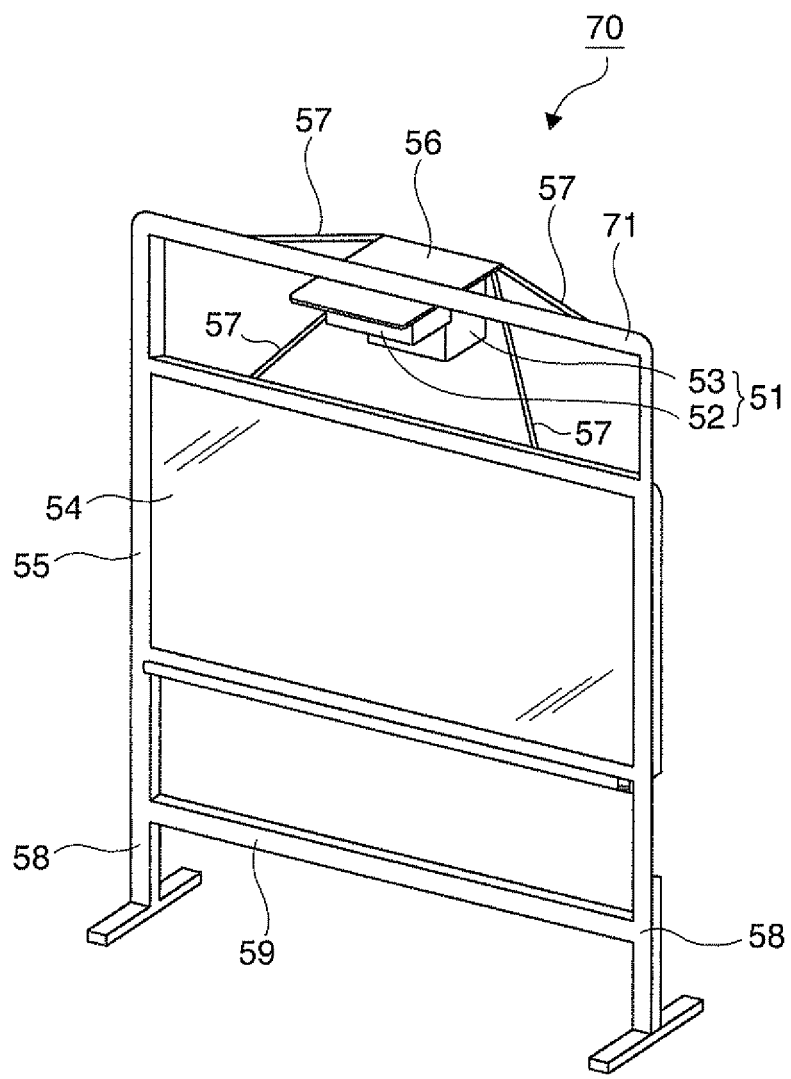
FIG. 31 is a front perspective view of an interactive board according to a modification of the fifth embodiment.

FIG. 31 is a front perspective view of an interactive board 70 according to a modification of the fifth embodiment. The interactive board 70 according to this modification is characterized in mounting the projector 51 perpendicularly above to the screen display unit 54. The projector mount 56 fixes the projector 51 to a prism 71 of the rest 55 formed over the screen display unit 54.

By arranging the projector 51 perpendicularly above to the screen display unit 54, image light is incident into the screen display unit 54 from perpendicularly above. When a user writes on the screen display unit 54 with a writing tool, a shadow of the tool appears perpendicularly downward. This may result in little possibility of missing of a writing position due to the shadow and hence improvement of user's convenience.

While it has been described in the above embodiments that the projector 1 illuminates the entire desired region of the liquid crystal display panels 18R, 18G and 18B with substantially uniform brightness using an optical system including a first lens array, a second lens array and a superimposing lens, the invention is not limited thereto, but the entire desired region of the liquid crystal display panels 18R, 18G and 18B may be illuminated with substantially uniform brightness using different illumination optical systems such as an optical system including a light guide rod.

Although it has been described in the above first to fourth embodiments that the projector 1 is applied as a front type projector to project a projection image from a side where the projection image is observed, the projector 1 may be applied as a rear type projector to project a projection image from a side which is opposite to the side where the projection image is observed.

Although it has been described in the above embodiments that the projector 1 is a projector using three liquid crystal display panels, the invention is not limited thereto but may be applied to a projector using one, two or four or more liquid crystal display panels.

The entire disclosure of Japanese Patent Application No. 2010-048845, filed Mar. 5, 2010 and Japanese Patent Application No. 2011-023650, filed Feb. 7, 2011 are expressly incorporated by reference herein.

What is claimed is:

1. A projector comprising:
a body including a light source, a display plane illuminated with light from the light source, and a projection optical system that projects light from the display plane; and
a projection unit that projects the light from the display plane through the projection optical system toward an illumination-targeted plane, the projection unit having a negative power convex angle-widening mirror, the angle-widening mirror reflecting light forming an image plane of the display plane for angle-widening, and the image plane being inclined to the display plane, wherein
the body is detachable from the projector, and
the projection optical system is switchable between a normal display state where an image forming the image plane of the display plane, the image plane being parallel to the display plane, is formed in a first range of a relatively long distance along an optical axis and a macro display state where an image forming the image plane of the display plane, the image plane being parallel to the display plane, is formed in a second range of a relatively short distance along the optical axis.

2. The projector according to claim 1,
wherein the projection unit includes an image plane control optical system in which the light projected from the projection optical system is light forming the image plane of the display plane, the image plane being inclined to the display plane.

3. The projector according to claim 2,
wherein the projection unit includes a variable magnification optical system which converts a magnification of an image forming the image plane of the display plane, the image plane being inclined to the display plane.

4. The projector according to claim 1,
wherein the projection unit forms the image plane of the display plane, the image plane being inclined to the display plane, on the illumination-targeted plane parallel to the display plane.

5. The projector according to claim 1,
wherein the projection optical system and the projection unit are arranged with the optical axes thereof coincided with each other.

6. The projector according to claim 5,
wherein the projecting optical system and the projection unit constitute a shift optical system which shifts the light from the display plane from the optical axis and travels the shifted light.

7. An interactive board comprising:
a projector according to claim 1; and
a screen display unit which includes the illumination-targeted plane and allows different information to be written on the illumination-targeted plane,
wherein the body of the projector including the projection optical system is attachable or detachable.

8. A projector comprising:
a body including a projection optical system, the projection optical system projecting image light; and
a projection unit that projects the image light projected from the projection optical system toward an illumination-targeted plane,
the projection unit including
a variable magnification optical system that converts a magnification of an image by the image light; and
an angle-widening mirror that reflects the image light from the variable magnification optical system for angle-widening, and
the variable magnification optical system that converts a magnification of an image forming an image plane inclined to an optical axis of the projection optical system,
wherein, when the image light is projected from the projection optical system without passing through the projection unit, with an image forming range where an image forming an image plane substantially perpendicular to the optical axis is formed is a first range and a range other than the first range in an optical path of the image light is a second range, and
wherein the projection optical system projects the image light forming an image plane inclined to the optical axis in the second range.

9. The projector according to claim 8,
wherein the projection optical system is switched between a first mode for displaying an image by the body alone and a second mode for displaying an image by a combination of the body and the projection unit.

10. The projector according to claim 8,
wherein the projection optical system, the variable magnification optical system and the angle-widening mirror are arranged with the optical axes thereof substantially coincided with one another.

11. The projector according to claim 10,
wherein the projection optical system, the variable magnification optical system and the angle-widening mirror constitute a shift optical system, the shift optical system shifts a flux of the image light from the optical axes and travels the shifted flux.

12. The projector according to claim 8,
wherein the angle-widening mirror folds back the image light such that the image plane is substantially parallel to the illumination-targeted plane.

13. An interactive board comprising:
a projector according to claim 8; and
a screen display unit which displays an image by image light incident from the projector and allows writing on a display plane of the image,
wherein the body of the projector including the projection optical system which projects the image light is attachable or detachable.

14. A projector comprising:
a body including a projection optical system, the projection optical system projecting image light; and
a projection unit that projects the image light projected from the projection optical system toward an illumination-targeted plane, wherein
the projection unit includes an angle-widening mirror that reflects the image light from the projection optical system for angle-widening,
the projection optical system forms an image plane inclined to the illumination-targeted plane,
when the image light is projected from the projection optical system without passing through the projection unit, with an image forming range where an image forming an image plane substantially perpendicular to the optical axis is formed is a first range and a range other than the first range in an optical path of the image light is a second range, and
the projection optical system projects the image light forming an image plane inclined to the optical axis in the second range.

15. The projector according to claim 14,
wherein the projection optical system is switched between a first mode for displaying an image by the body alone and a second mode for displaying an image by a combination of the body and the projection unit.

16. The projector according to claim 14,
wherein the projection optical system, the variable magnification optical system and the angle-widening mirror are arranged with the optical axes thereof substantially coincided with one another.

17. The projector according to claim 16,
wherein the projection optical system, the variable magnification optical system and the angle-widening mirror constitute a shift optical system, the shift optical system shifts a flux of the image light from the optical axes and travels the shifted flux.

18. The projector according to claim 14,
wherein the angle-widening mirror folds back the image light such that the image plane is substantially parallel to the illumination-targeted plane.

19. An interactive board comprising:
a projector according to claim 14; and
a screen display unit which displays an image by image light incident from the projector and allows writing on a display plane of the image,
wherein the body of the projector including the projection optical system which projects the image light is attachable or detachable.

20. A projection unit which is used in combination with a body including a projection optical system which projects image light, and projects the image light projected from the projection optical system toward an illumination-targeted plane, comprising:
a variable magnification optical system which converts a magnification of an image by the image light projected from the projection optical system; and
an angle-widening mirror which reflects the image light from the variable magnification optical system for angle-widening,
wherein the variable magnification optical system converts a magnification of an image forming an image plane inclined to an optical axis of the projection optical system,
wherein, when the image light is projected from the projection optical system without passing through the projection unit, with an image forming range where an image forming an image plane substantially perpendicular to the optical axis is formed is a first range and a range other than the first range in an optical path of the image light is a second range, and
wherein the projection optical system projects the image light forming an image plane inclined to the optical axis in the second range.

21. The projection unit according to claim 20,
wherein the variable magnification optical system and the angle-widening mirror are arranged with the optical axes thereof substantially coincided with each other.

22. The projection unit according to claim 20,
wherein the angle-widening mirror folds back the image light such that the image plane is substantially parallel to the illumination-targeted plane.

23. An interactive board comprising:
a projector according to claim 20; and
a screen display unit which displays an image by image light incident from the projector and allows writing on a display plane of the image,
wherein the body of the projector including the projection optical system which projects the image light is attachable or detachable.

24. The projector according to claim 14,
wherein the body is attached to or detached from the projector.

25. The projector according to claim 8,
wherein the body is attached to or detached from the projector.

26. The projector according to claim 8,
wherein the angle-widening mirror is a convex mirror.

27. The projector according to claim 14,
wherein the angle-widening mirror is a convex mirror.

28. The projector according to claim 20,
wherein the angle-widening mirror is a convex mirror.

* * * * *